US012740565B2

(12) United States Patent
Okajima et al.

(10) Patent No.: US 12,740,565 B2
(45) **Date of Patent: *Sep. 22, 2026**

(54) METHOD FOR CONTROLLING HERBICIDE-RESISTANT WEEDS

(71) Applicant: SUMITOMO CHEMICAL COMPANY, LIMITED, Chuo-ku (JP)

(72) Inventors: Yuki Okajima, Chuo-ku (JP); Mai Toriumi, Osaka (JP); Yoshinao Sada, Kasai (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 387 days.

This patent is subject to a terminal disclaimer.

(21) Appl. No.: 18/258,969

(22) PCT Filed: Dec. 21, 2021

(86) PCT No.: PCT/JP2021/047299
§ 371 (c)(1),
(2) Date: Jun. 22, 2023

(87) PCT Pub. No.: WO2022/138633
PCT Pub. Date: Jun. 30, 2022

(65) Prior Publication Data

US 2024/0049713 A1 Feb. 15, 2024

(30) Foreign Application Priority Data

Dec. 24, 2020 (JP) ................................ 2020-214559

(51) Int. Cl.
*A01N 53/00* (2006.01)
*A01P 13/02* (2006.01)

(52) U.S. Cl.
CPC .............. *A01N 53/00* (2013.01); *A01P 13/02* (2021.08)

(58) Field of Classification Search
None
See application file for complete search history.

(56) References Cited

U.S. PATENT DOCUMENTS

| | | | | |
|---|---|---|---|---|
| 6,403,534 | B1 | 6/2002 | Komori et al. | |
| 2019/0254277 | A1 | 8/2019 | Jin | |
| 2024/0049711 | A1* | 2/2024 | Okajima | ................ A01N 57/20 |

FOREIGN PATENT DOCUMENTS

| | | | |
|---|---|---|---|
| JP | 2002-193949 | A | 7/2002 |
| WO | WO 2018/019842 | A1 | 2/2018 |

(Continued)

OTHER PUBLICATIONS

Pioneer (https://web.archive.org/web/20191210110510/https://www.pioneer.com/us/agronomy/glyphosate-resistant-waterhemp-IL.html), 2019 no pagination.*

(Continued)

*Primary Examiner* — Erin E Hirt
(74) *Attorney, Agent, or Firm* — Oblon, McClelland, Maier & Neustadt, L.L.P.

(57) ABSTRACT

To provide a method for effectively controlling specific weeds having resistance to herbicides. Disclosed is a method for controlling PPO inhibitor-resistant weeds, which comprises a step of applying one or more uracil compounds selected from the group consisting of a compound represented by the following formula (I), a compound represented by the following formula (II) and a compound represented by the following formula (III).

(I)

(II)

(III)

9 Claims, No Drawings

(56) References Cited

FOREIGN PATENT DOCUMENTS

| | | |
|---|---|---|
| WO | WO 2018/019845 A1 | 2/2018 |
| WO | WO 2018/029029 A1 | 2/2018 |
| WO | WO 2019/163617 A1 | 8/2019 |

OTHER PUBLICATIONS

Quinn (https://aces.illinois.edu/news/palmer-amaranths-molecular-secrets-reveal-troubling-potential-0#:~:text=Tranel's%20second%20new%20study%20explains,4%20inches%2C%20it's%20all%20over.) Sep. 16, 2019, no pagination.*

University of Minnesota Extension no pagination, cached wayback machine, 2021 (https://web.archive.org/web/20211128144110/https://extension.umn.edu/herbicide-mode-action-and-sugarbeet-injury-symptoms/cell-membrane-disruption-herbicides#pyrimidinedione-1665863).*

International Search Report issued Mar. 8, 2022, in PCT/JP2021/047299 (with English Translation), 11 pages.

* cited by examiner

METHOD FOR CONTROLLING HERBICIDE-RESISTANT WEEDS

CROSS-REFERENCE TO RELATED APPLICATIONS

The present application is a 35 U.S.C. § 371 national stage patent application of International patent application PCT/JP2021/047299, filed on Dec. 21, 2021, which is based on and claims the benefits of priority to Japanese Application No. 2020-214559, filed on Dec. 24, 2020. The entire contents of these applications are incorporated herein by reference.

TECHNICAL FIELD

The present invention relates to a method for controlling weeds having resistance to herbicides.

BACKGROUND ART

Uracil compounds having herbicidal activity have been known as an active ingredient for PPO inhibitor. Also it has been disclosed that waterhemp having resistance to PPO inhibitors having a Gly210 deficiency in PPO can be controlled with some types of PPO inhibitors.

PRIOR ART DOCUMENT

Patent Document

Patent Document 1: U.S. Pat. No. 6,403,534

Patent Document 2: WO 2018/02909 A1

SUMMARY OF THE INVENTION

Problems to be Solved by Invention

An object of the present invention is to provide a method for effectively controlling specific weeds having resistance to herbicides.

Means to Solve Problems

The present inventors have found that excellent control effect on specific weeds having resistance to PPO inhibitors is exerted by applying one or more uracil compounds selected from the group consisting of a compound represented by the following formula (I), a compound represented by the following formula (II) and a compound represented by the following formula (III).

The present invention includes the following aspects.

[1] A method for controlling PPO inhibitor-resistant weeds, the method comprising applying one or more uracil compounds selected from the group consisting of a compound represented by the following formula (I):

(I)

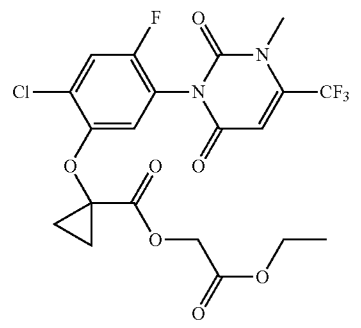

a compound represented by the following formula (II):

(II)

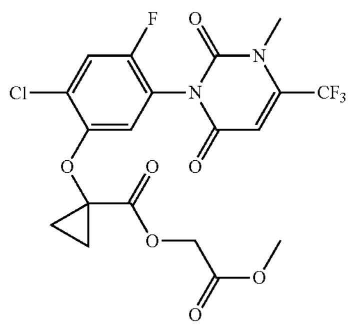

and a compound represented by the following formula (III):

(III)

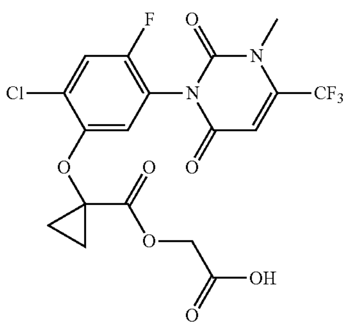

[2] The control method according to [1], wherein the PPO inhibitor-resistant weed is PPO inhibitor-resistant palmer amaranth, waterhemp or common ragweed.

[3] The control method according to [1], wherein the resistance of the PPO inhibitor-resistant weed is target-site resistance.

[4] The control method according to [1], wherein the resistance of the PPO inhibitor-resistant weed is non-target-site resistance.

[5] The control method according to [1], which is carried out in crop cultivation.

[6] The control method according to [5], wherein the crop is one crop selected from a group consisting of soybean, corn, cotton, rapeseed, rice, wheat, barley, sugar cane, sugar beet, *sorghum* and sunflower.

[7] The control method according to [5], wherein the crop is a crop which is imparted with tolerance to one or more uracil compounds selected from the group consisting of the compound represented by the formula (I), the compound represented by the formula (II) and the compound represented by the formula (III).

[8] The control method according to [1], wherein the PPO inhibitor-resistant weed has acquired resistance to other herbicides.

Effects of Invention

According to the method for controlling weeds having resistance to herbicides of the present invention, it is possible to control specific weeds having resistance to herbicides.

MODE FOR CARRYING OUT THE INVENTION

The method for controlling weeds having resistance to herbicides of the present invention (hereinafter sometimes referred to as present method) comprises a step of applying one or more uracil compounds (hereinafter referred to as present uracil compound) selected from the group consisting of a compound represented by the above formula (I) (hereinafter referred to as compound X), a compound represented by the above formula (II) (hereinafter referred to as compound Y) and a compound represented by the above formula (III) (hereinafter referred to as compound Z) to a cultivation field of crop or a non-crop area.

The present uracil compound can be produced according to the method mentioned in U.S. Pat. No. 6,403,534.

In the case where the method for controlling weeds having resistance to herbicides of the present invention is carried out in crop cultivation, the present uracil compound may be applied in the crop field before, simultaneously with and/or after seeding crop seeds.

The present uracil compound used in the present invention is usually mixed with carriers such as solid carriers or liquid carriers and, if necessary, adjuvants for formulation, such as surfactants are added to form a formulation. Preferred formulation types are suspension concentrates, oil dispersions, wettable powders, water dispersible granules, granules, water-based emulsions, oil-based emulsions and emulsifiable concentrates, and more preferably emulsifiable concentrates. A formulation containing the present uracil compound alone as a pesticidal active ingredient may be used alone, or the formulation may be used in combination with a formulation containing other herbicides. A formulation containing the present uracil compound and other herbicides as agricultural chemical active ingredients may be used, or a formulation may be mixed with a formulation containing other herbicides.

Examples of solid carrier include clay (pyrophyllite clay, kaolin clay, etc.), talc, calcium carbonate, diatomaceous earth, zeolite, bentonite, acid clay, attapulgite, white carbon, ammonium sulfate, vermiculite, perlite, pumice stone, silica sand, fine powders and granules of chemical fertilizers (ammonium sulfate, ammonium phosphate, ammonium nitrate, urea, ammonium chloride, etc.) and resins (polypropylene, polypropylene, polyester, polyurethane, polyamide, polyvinyl chloride, etc.).

Examples of the liquid carrier include water, alcohols (ethanol, cyclohexanol, benzyl alcohol, propylene glycol, polyethylene glycol, etc.), ketones (acetone, cyclohexanone, etc.), aromatic hydrocarbons (xylene, phenylxylylethane, methylnaphthalene, etc.), aliphatic hydrocarbons (hexane, cyclohexane, etc.), esters (ethyl acetate, methyl oleate, propylene carbonate, etc.), nitriles (acetonitrile, etc.), ethers (ethylene glycol dimethyl ether, etc.), amides (N,N-dimethylformamide, N,N-dimethyloctanamide, etc.), sulfoxides (dimethylsulfoxide, etc.), lactams (N-methylpyrrolidone, N-octylpyrrolidone, etc.), fatty acids (oleic acid, etc.) and vegetable oils (soybean oil, etc.).

Examples of the surfactant include nonionic surfactants (polyoxyethylene alkyl ether, polyoxyethylene alkyl aryl ether, polyethylene glycol fatty acid ester, etc.) and anionic surfactants (alkyl sulfonate, alkyl aryl sulfonate, alkyl sulfate, etc.).

Examples of the other adjuvant for formulation include binders, dispersants, colorants and stabilizers, and specific examples thereof include polysaccharides (starch, gum arabic, cellulose derivatives, alginic acid, etc.), lignin derivatives, water-soluble synthetic polymers (polyvinyl alcohol, polyvinylpyrrolidone, polyacrylic acids, etc.), acidic isopropyl phosphate and dibutylhydroxytoluene.

A formulation containing the present uracil compound may contain antifreeze agents and preservatives. Examples of the antifreeze agent include propylene glycol (hereinafter referred to as PG) and glycerol (hereinafter referred to as GL). Examples of the preservative include 2-methyl-4-isothiazolin-3-one (hereinafter referred to as MIT), 5-chloro-2-methyl-4-isothiazolin-3-one (hereinafter referred to as CMIT), 2-n-octyl-4-isothiazolin-3-one (hereinafter referred to as OIT) and 1,2-benzisothiazolin-3-one (hereinafter referred to as BIT).

Examples of the combination of the present uracil compound and the antifreeze agent or preservative are shown below. Numbers in parentheses indicate weight ratios. In the following combinations, BIT can be replaced by any one of OIT, MIT and CMIT, or a mixture of two or more thereof selected from BIT, OIT, MIT and CMIT.

Compound X+BIT (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

Compound X+PG (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

Compound X+GL (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

Compound Y+BIT (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

Compound Y+PG (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

Compound Y+GL (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

Compound Z+BIT (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

Compound Z+PG (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

Compound Z+GL (1:0.0001, 1:0.0002, 1:0.0003, 1:0.0004, 1:0.0005, 1:0.0006, 1:0.0007, 1:0.0008, 1:0.0009, 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 1:100)

The crop field in the present invention may include a food crop field such as a peanut field, a soybean (indeterminate growth habit, determinate growth habit, semi-determinate growth habit) field, a corn (dent corn, flint corn, flour corn, popcorn, waxy corn, sweet corn, field corn) field and a wheat (bread wheat (soft wheat, hard wheat, medium wheat, red wheat, white wheat), durum wheat, spelt wheat, club wheat, and, winter habit and spring habit thereof) field, a barley (two-row barley (beer barley), six-row barley, hulless barley, hulless waxy barley and, winter habit and spring habit thereof) field, a feed crop field such as a *sorghum* field and an oat field, an industrial crop field such as a cotton (upland cotton, pima cotton) field and a rapeseed field, a canola (winter habit, spring habit) field and sugar crops such as a sugarcane field and a sugar beet field.

The vegetable field in the present invention may include a field for cultivating solanaceae vegetables (eggplant, tomato, green pepper, chili pepper, potato, etc.), a field for cultivating Cucurbitaceae vegetables (cucumber, pumpkin, zucchini, watermelon, melon, etc.), a field for cultivating cruciferous vegetables (radish, turnip, horseradish, kohlrabi, Chinese cabbage, cabbage, mustard, broccoli, cauliflower, etc.), a field for cultivating Asteraceae vegetables (burdock, crown daisy, artichoke, lettuce, etc.), a field for cultivating Liliaceae vegetables (Welsh onion, onion, garlic, asparagus, etc.), a field for cultivating Umbelliferae vegetables (carrot, parsley, celery, parsnip, etc.), a field for cultivating Chenopodiaceae vegetables (spinach, chard, etc.), a field for cultivating Lamiaceae vegetables (perilla, mint, basil, lavender, etc.), a strawberry field, a sweet potato field, a yam field, and a taro field, etc.

The land under perennial crops in the present invention may include an orchard, a tea field, a mulberry field, a coffee field, a banana field, a palm field, a flowering tree farm, a flowering tree field, a planting stock field, a nursery field, a forest land, or a garden. The orchard tree in the present invention may include pome fruits (apple, pear, Japanese pear, Chinese quince, quince, etc.), stone fruits (peach, plum, nectarine, Japanese apricot, cherry, apricot, prune, etc.), citrus fruits (citrus unshiu, orange, lemon, lime, grapefruit, etc.), nut trees (chestnut, walnut, hazelnut, almond, pistachio, cashew nut, macadamia nut, etc.), berry fruits (grape, blueberry, cranberry, blackberry, raspberry, etc.), persimmon, olive, loquat, etc.

The non-crop area in the present invention may include an athletic field, an empty lot, a railroad edge, a park, a parking area, a road edge, a dry riverbed, under power lines, a building land, a factory site, etc.

The crops cultivated in a crop field in the present invention is not limited as long as their varieties are varieties which are usually cultivated as crops.

The plant of the variety mentioned above may be a plant which can be produced by natural hybridization, a plant which can occur as the result of a mutation, an F1 hybrid plant, or a transgenic plant (also referred to as a "genetically modified plant"). These plants generally have properties such as a property that the tolerance to a herbicide is imparted, a property that a toxic substance against pests is accumulated, a property that the sensitivity to a plant disease is suppressed, a property that yield potential is increased, a property that the resistance to a biological or non-biological stress factor is improved, a property that a substance is accumulated, and improvement in a storage property or processability.

The term "F1 hybrid plant" refers to a plant of a first filial generation which is produced by hybridizing two different varieties with each other, and is generally a plant which has a more superior trait to that of either one of parents thereof, i.e., has a hybrid vigor property. The term "transgenic plant" refers to a plant which is produced by introducing a foreign gene from another organism such as a microorganism into a plant and which has a property that cannot be acquired easily by hybridization breeding, induction of a mutation or a naturally occurring recombination under a natural environment.

Examples of the technique for producing the above-mentioned plants include a conventional breeding technique, a transgenic technique, a genome-based breeding technique, a new breeding technique, and a genome editing technique. The conventional breeding technique is a technique for producing a plant having a desirable property by mutation or hybridization. The transgenic technique is a technique for imparting a new property to a specific organism (e.g., a microorganism) by isolating a gene (DNA) of interest from the organism and then introducing the gene (DNA) into the genome of another target organism, and an antisense technique or an RNA interference technique which is a technique for imparting a new or improved property to a plant by silencing another gene occurring in the plant. The genome-based breeding technique is a technique for increasing the efficiency of breeding using genomic information, and includes a DNA marker (also referred to as "genome marker" or "gene marker") breeding technique and genomic selection. For example, the DNA marker breeding is a method in which an offspring having a desired useful trait gene is selected from many hybrid offsprings using a DNA marker that is a DNA sequence capable of serving as an indicator of the position of a specific useful trait gene on a genome. The analysis of a hybrid offspring of a plant at a seedling stage thereof using the DNA marker has such a characteristic that it becomes possible to shorten the time required for breeding effectively.

The genomic selection is such a technique that a prediction equation is produced from a phenotype and genomic information both obtained in advance and then a property is predicted from the prediction equation and the genomic information without carrying out the evaluation of the phenotype. The genomic selection can contribute to the increase in efficiency of breeding. A "new breeding technique" is a collective term for combinations of breeding techniques including molecular biological techniques. Examples of the new breeding technique include techniques such as cisgenesis/intragenesis, oligonucleotide-directed mutagenesis, RNA-dependent DNA methylation, genome editing, grafting to a GM rootstock or scion, reverse breeding, agroinfiltration, and seed production technology (SPT). The genome editing technique is a technique that converts genetic information in a sequence-specific manner, and enables deletion of a base sequence, substitution of an amino acid sequence, introduction of a foreign gene and the like. Examples of the tool for the technique include zinc-finger nuclease (ZFN), TALEN, CRISPR/Cas9, CRISPR/Cpf1 and meganuclease which can cleave DNA in a sequence-specific manner, and a sequence-specific genome modification technique using CAS9 nickase, Target-AID and the like which is produced by any one of the modification of the above-mentioned tools.

Examples of the above-mentioned plants include plants listed in genetically modified crops registration database (GM APPROVAL DATABASE) in an electric information site in INTERNATIONAL SERVICE for the ACQUISITION of AGRI-BIOTECH APPLICATIONS, ISAAA) (www.isaaa.org). More specific examples of the plans include a herbicide-tolerant plant, a insect-resistant plant, a plant disease-resistant plant, a plant of which the quality (e.g., the increase or decrease in content or the change in composition) of a product (e.g., starch, amino acid, fatty acid, etc.) is modified, a fertility trait modified plant, a non-biological stress-tolerant plant or a plant of which a trait associated with growth or yield is modified.

The plant imparted with tolerance to a herbicide by a transgenic technique also includes plants each, by a transgenic technique, imparted with the tolerance to: a 4-hydroxyphenylpyruvate dioxygenase (abbreviated as "HPPD", hereinafter) inhibitor such as isoxaflutole and mesotrione; an acetolactate synthase (abbreviated as "ALS", hereinafter) inhibitor such as an imidazolinone-type herbicide including imazethapyr and a sulfonylurea-type herbicide including thifensulfuron-methyl; a 5-enolpyruvylshikimate-3-phosphate synthase (abbreviated as "EPSP", hereinafter) inhibitor such as glyphosate; a glutamine synthase inhibitor such as glufosinate; an auxin-type herbicide such as 2,4-D and dicamba; and an oxynil-type herbicide including bromoxynil. Preferred examples of the herbicide-tolerant transgenic plant include: a cereal such as wheat, barley, rye and oat; canola, *sorghum*, soybean, rice, rapeseed, sugar beet, sugarcane, grape, lentil, sunflower, alfalfa, pome fruits, stone fruits, coffee, tea, strawberry, wheat grass, and a vegetable such as tomato, potato, cucumber and lettuce; more preferably a cereal such as wheat, barley, rye and oat, soybean, rice, vine, tomato, potato, and a pomaceous fruit.

Hereinbelow, specific examples of the herbicide-tolerant plant will be mentioned.

Plants tolerant to glyphosate herbicides; produced by introducing at least one of a glyphosate-tolerant EPSPS gene originated from *Agrobacterium tumefaciens* strain CP4 (CP4 epsps), a glyphosate-metabolizing enzyme gene in which metabolic activity is enhanced by a shuffling technique for a glyphosate-metabolizing enzyme (glyphosate N-acetyltransferase) gene originated from *Bacillus licheniformis* (gat4601, gat4621), a glyphosate-metabolizing enzyme originated from *Ochrobacterum anthropi* strain LBAA (glyphosate oxidase gene, goxv247) or an EPSPS gene originated from corn and having a glyphosate tolerance mutation (mepsps, 2mepsps). Examples of the major plant include alfalfa (*Medicago sativa*), *Argentina canola* (*Brassica napus*), cotton (*Gossypium hirsutum* L.), creeping bentgrass (*Agrostis stolonifera*), corn (*Zea mays* L.), polish canola (*Brassica rapa*), potato (*Solanum tuberosum* L.), soybean (*Glycine max* L.), sugar beet (*Beta vulgaris*) and wheat (*Triticum aestivum*). Some of the glyphosate-tolerant transgenic plants are commercially available. For example, a genetically modified plant which expresses glyphosate-tolerant EPSPS originated from *Agrobacterium* is commercially available by trade names including the trademark of "Roundup Ready (registered trademark)"; a genetically modified plant which expresses a glyphosate-metabolizing enzyme originated from *Bacillus* in which metabolic activity is enhanced by a shuffling technique is commercially available by the trade names of "Optimum (registered trademark) GAT (trademark)", "Optimum (registered trademark) Gly canola" and the like; and a genetically modified plant which expresses EPSPS having a glyphosate tolerance mutation originated from corn is commercially available by the trademark of "GlyTol (trademark)".

Plants tolerant to glufosinate herbicides; produced by introducing at least one of a gene (bar) for phosphinothricin N-acetyltransferase (PAT) which is a glufosinate-metabolizing enzyme originated from *Streptomyces hygroscopicus*, a gene (pat) for a phosphinothricin N-acetyltransferase (PAT) enzyme which is a glufosinate-metabolizing enzyme originated from *Streptomyces viridochromogenes* or a synthetic pat gene (pat syn) originated from *Streptomyces viridochromogenes* strain Tu494. Examples of the major plant include *Argentina canola* (*Brassica napus*), chicory (*Cichorium intybus*), cotton (*Gossypium hirsutum* L.), corn (*Zea mays* L.), polish canola (*Brassica rapa*), rice (*Oryza sativa* L.), soybean (*Glycine max* L.) and sugar beet (*Beta vulgaris*). Some of the glufosinate-tolerant genetically modified plants are commercially available. The glufosinate-metabolizing enzyme (bar) originated from *Streptomyces hygroscopicus* and a genetically modified plant originated from *Streptomyces viridochromogenes* are commercially available by the trade names including "LibertyLink (trademark)", "InVigor (trademark)" and "WideStrike (trademark)".

Plants tolerant to oxynil-type herbicides (e.g., bromoxynil); includes transgenic plants tolerant to oxynil-type herbicides, for example, bromoxynil, into which a nitrilase gene (bxn) which is an oxynil-type herbicide (e.g., bromoxynil)-metabolizing enzyme originated from *Klebsiella pneumoniae* subsp. Examples of the major plant include *Argentina canola* (*Brassica napus*), cotton (*Gossypium hirsutum* L.) and tobacco (*Nicotiana tabacum* L.), which are commercially available by the trade names including "Navigator (trademark) canola" or "BXN (trademark)".

Plants tolerant to ALS inhibitors; carnation (*Dianthus caryophyllus*) having, introduced therein, an ALS inhibitor-tolerant ALS gene (surB) originated from tobacco (*Nicoti-*

*ana tabacum*) as a selection marker is commercially available by the trade names of "Moondust (trademark)", "Moonshadow (trademark)", "Moonshade (trademark)", "Moonlite (trademark)", "Moonaqua (trademark)", Moonvista (trademark)", "Moonique (trademark)", "Moonpearl (trademark)", "Moonberry (trademark)" and "Moonvelvet (trademark)"; lineseed (*Linum usitatissumum* L.) having, introduced therein, an ALS inhibitor-tolerant ALS gene (als) originated from mouse-ear cress (*Arabidopsis thaliana*) is commercially available by the trademark of "CDC Triffid Flax"; corn (*Zea mays* L.) having tolerance to a sulfonylurea-type herbicide and an imidazolinone-type herbicide and having, introduced therein, an ALS inhibitor-tolerant ALS gene (zm-hra) originated from corn is commercially available by the trademark of "Optimum (trademark) GAT (trademark)"; soybean having tolerance to an imidazolinone-type herbicide and having, introduced therein, an ALS inhibitor-tolerant ALS gene (csrl-2) originated from mouse-ear cress is commercially available by the trademark of "Cultivance"; and soybean having tolerance to a sulfonylurea-type herbicide and having, introduced therein, an ALS inhibitor-tolerant ALS gene (gm-hra) originated from soybean (*Glycine max*) is commercially available by the trade names of "Treus (trademark)", "Plenish (trademark)" and "Optimum GAT (trademark)". Cotton having, introduced therein, an ALS inhibitor-tolerant ALS gene (S4-HrA) originated from tobacco (*Nicotiana tabacum* cv. Xanthi) can also be mentioned.

Plants tolerant to HPPD inhibitors; soybean into which both a mesotrione-tolerant HPPD gene (avhppd-03) originated from oat (*Avena sativa*) and a gene (pat) for a phosphinothricin N-acetyltransferase (PAT) enzyme which is a glufosinate-metabolizing enzyme originated from *Streptomyces viridochromogenes* are introduced is commercially available by the trademark of "Herbicide-tolerant Soybean line".

Plants tolerant to 2,4-D; corn having, introduced therein, an aryloxyalkanoate dioxygenase gene (aad-1) which is a 2,4-D-metabolizing enzyme originated from *Sphingobium herbicidovorans* is commercially available by the trademark of "Enlist (trademark) Maize". Soybean and cotton having, introduced therein, an aryloxyalkanoate dioxygenase gene (aad-12) which is a 2,4-D-metabolizing enzyme originated from *Delftia acidovorans* are commercially available by the trademark of "Enlist (trademark) Soybean".

Plants tolerant to dicamba; includes soybean and cotton having, introduced therein, a dicamba monooxygenase gene (dmo) which is a dicamba-metabolizing enzyme originated from *Stenotrophomonas maltophilia* strain DI-6. Soybean (*Glycine max* L.) into which a glyphosate-tolerant EPSPS gene (CP4 epsps) originated from *Agrobacterium tumefaciens* strain CP4 is also introduced simultaneously with the above-mentioned gene is commercially available as "Genuity (registered trademark) Roundup Ready (trademark) 2 Xtend (trademark)".

Examples of a commercially available transgenic plant imparted with tolerance to herbicides include corn "Roundup Ready Corn", "Roundup Ready 2", "Agrisure GT", "Agrisure GT/CB/LL", "Agrisure GT/RW", "Agrisure 3000GT", "YieldGard VT Rootworm/RR2" and "YieldGard VT Triple" each having tolerance to glyphosate; soybean "Roundup Ready Soybean" and "Optimum GAT" each having tolerance to glyphosate; cotton "Roundup Ready Cootton" and "Roundup Ready Flex" each having tolerance to glyphosate; canola "Roundup Ready Canola" having tolerance to glyphosate; alfalfa "Roundup Ready Alfalfa" having tolerance to glyphosate and rice "Roundup Ready Rice" having tolerance to glyphosate; corn "Roundup Ready 2", "Liberty Link", "Herculex 1", "Herculex RW", "Herculex Xtra", "Agrisure GT/CB/LL", "Agrisure CB/LL/RW" and "Bt10" each having tolerance to glufosinate; cotton "FiberMax Liberty Link" having tolerance to glufosinate; rice "Liberty Link Rice" having tolerance to glufosinate; canola "in Vigor" having tolerance to glufosinate; cotton "BXN" having tolerance to bromoxynil; and canola "Navigator" and "Compass" having tolerance to bromoxynil. Other plants which are modified with respect to herbicides are also widely known, such as: alfalfa, apple, barley, *Eucalyptus*, lineseed, grape, lentil, rapeseed, pea, potato, rice, sugar beet, sunflower, tobacco, tomato, turf grass and wheat each having tolerance to glyphosate (see, for example, U.S. Pat. Nos. 5,188,642, 4,940,835, 5,633,435, 5,804,425 and 5,627,061); bean, cotton, soybean, pea, potato, sunflower, tomato, tobacco, corn, *sorghum* and sugarcane each having tolerance to dicamba (see, for example, WO 2008051633, U.S. Pat. Nos. 7,105,724 and 5,670,454); soybean, sugar beet, potato, tomato and tobacco each having tolerance to glufosinate (see, for example, U.S. Pat. Nos. 6,376,754, 5,646,024 and 5,561,236); cotton, peppers, apple, tomato, sunflower, tobacco, potato, corn, cucumber, wheat, soybean, *sorghum* and millets each having tolerance to 2,4-D (see, for example, U.S. Pat. Nos. 6,153,401, 6,100,446, WO 2005107437, U.S. Pat. Nos. 5,608,147 and 5,670,454); canola, corn, barnyard millet, barley, cotton, brown mustard, lettuce, lentil, melon, foxtail millet, oat, rapeseed, potato, rice, rye, *sorghum*, soybean, sugar beet, sunflower, tobacco, tomato and wheat each having tolerance to an ALS inhibitor (e.g., a sulfonylurea-type herbicide and an imidazolinone-type herbicide) (see, for example, U.S. Pat. No. 5,013,659, WO 2006060634, U.S. Pat. Nos. 4,761,373, 5,304,732, 6,211,438, 6,211,439 and 6,222,100) (particularly, rice having tolerance to an imidazolinone-type herbicide; rice having a specific mutation (e.g., S653N, S654K, A122T, S653(At)N, S654(At)K, A122(At)T) in an acetohydroxyacid synthase gene and the like (see, for example, US 2003/0217381, WO 2005/20673)); barley, sugarcane, rice, corn, tobacco, soybean, cotton, rapeseed, sugar beet, wheat and potato each having tolerance to an HPPD inhibitor (e.g., an isoxazole-type herbicide such as isoxaflutole; a triketone-type herbicide such as sulcotrione and mesotrione; a pyrazole-type herbicide such as pyrazolynate and diketonitrile that is a decomposition product of isoxaflutole) (see, for example, WO 2004/055191, WO 199638567, WO 1997049816 and U.S. Pat. No. 6,791,014).

Examples of a plant that is imparted with tolerance to a herbicide by a classical breeding technique or genome-based breeding technique include: rice "Clearfield Rice", wheat "Clearfield Wheat", sunflower "Clearfield Sunflower", lentil "Clearfield lentils" and canola "Clearfield canola" (a product by manufactured by BASF) each having tolerance to an imidazolinone-type ALS inhibitor such as imazethapyr and imazamox; soybean "STS soybean" having tolerance to a sulfonylurea-type ALS inhibitor such as thifensulfuron-methyl; sethoxydim-tolerant corn "SR corn" and "Poast Protected (registered trademark) corn" having tolerance to an acetyl CoA carboxylase inhibitor such as a trione oxime-type herbicide and an aryloxyphenoxypropionate-type herbicide; for example, sunflower "ExpressSun (registered trademark)" having tolerance to a sulfonylurea-type herbicide such as tribenuron; rice "Rrovisia (trademark) Rice" having tolerance to an acetyl CoA carboxylase inhibitor such as quizalofop; canola "Triazine Tolerant Canola" having tolerance to a PSII inhibitor.

An example of a plant that is imparted with tolerance to a herbicide by a genome editing technique is canola "SU Canola (registered trademark)" having tolerance to a sulfonylurea-type herbicide and produced by Rapid Trait Development System (RIDS (registered trademark)). RIDS (registered trademark) corresponds to an oligonucleotide-directed mutagenesis employed in a genome editing technique, and is a technique whereby it becomes possible to introduce a mutation into a plant through Gene Repair Oligonucleotide (GRON), i.e., a DNA-RNA chimeric oligonucleotide, without needing to cleave DNA in the plant. Other examples of the plant also include: corn which is reduced in herbicide tolerance and a phytic acid content as the result of the deletion of endogenous gene IPK1 using a zinc finger nuclease (see, for example, Nature 459, 437-441 2009); and rice which is imparted with herbicide tolerance using CRISPR/Cas9 (see, for example, Rice, 7, 5 2014).

The crop tolerant to a specific PPO inhibitor in the present invention includes a crop which is imparted with ability to produce PPO with decreased affinity to the PPO inhibitor by a transgenic technique and a crop which is imparted with ability to detoxicate/decompose the PPO inhibitor by cytochrome P450 monooxygenase by a transgenic technique. The crop tolerant to a specific PPO inhibitor may be a crop which is imparted with both ability to produce PPO with decreased affinity to the PPO inhibitor and ability to detoxicate/decompose the PPO inhibitor by cytochrome P450 monooxygenase by a transgenic technique. These tolerant crops are mentioned in, for example, Patent Documents such as WO 2011085221, WO 2012080975, WO 2014030090, WO 2015022640, WO 2015022636, WO 2015022639, WO 2015092706, WO 2016203377, WO 2017198859, WO 2018019860, WO 2018022777, WO 2017112589, WO 2017087672, WO 2017039969, WO 2017023778, WO 2018022777, WO 2019118726 and Non-Patent Document (Pest Management Science, 61, 2005, 277-285).

The technique imparting tolerance to a herbicide by a new breeding technique includes a breeding technique employing grafting, and as an example of imparting a trait of a GM rootstock to a scion, soybean in which tolerance to glyphosate is imparted to a non-transgenic soybean scion using Roundup Ready (registered trademark) soybean having tolerance to glyphosate as a rootstock (see Weed Technology 27:412-416 2013) can be mentioned.

The plants mentioned above also include a line imparted with two or more of tolerance to non-biological stress, plant disease resistance, tolerance to herbicides, insect resistance, growth or yield trait, nutrient uptake, quality of a product, fertility trait and the like as previously mentioned, using a transgenic technique, a classical breeding technique, a genome-based breeding technique, a new breeding technique or genome editing technique or the like, and a line imparted with two or more properties of a parental line by crossing plants of the same kind or having different properties.

Examples of a commercially available plant imparted with tolerance to two or more herbicides include: cotton "GlyTol (trademark) LibertyLink (trademark)" and "GlyTol (trademark) LibertyLink (trademark)" each having tolerance to glyphosate and glufosinate; corn "Roundup Ready (trademark) LibertyLink (trademark) Maize" having tolerance to glyphosate and tolerance to glufosinate; soybean "Enlist (trademark) Soybean" having tolerance to glufosinate and tolerance to 2,4-D; soybean "tenuity (registered trademark) Roundup Ready (trademark) 2 Xtend (trademark)" having tolerance to glyphosate and tolerance to dicamba; corn and soybean "OptimumGAT (trademark)" having tolerance to glyphosate and tolerance to an ALS inhibitor; genetically modified soybean "Enlist E3 (trademark)" and "Enlist (trademark) Roundup Ready 2 Yield (registered trademark)" each having tolerance to three herbicides of glyphosate, glufosinate and 2,4-D; genetically modified corn "Enlist (trademark) Roundup Ready (registered trademark) Corn 2" having tolerance to glyphosate, 2,4-D and aryloxyphenoxypropionate-type (FDPs) herbicides; genetically modified corn "Enlist (trademark) Roundup Ready (registered trademark) Corn 2" having tolerance to glyphosate, 2,4-D and aryloxyphenoxypropionate-type (FDPs) herbicides; genetically modified cotton "Bollgard II (registered trademark) XtendFlex (trademark) Cotton" having tolerance to dicamba, glyphosate and glufosinate; and genetically modified cotton "Enlist (trademark) Cotton" having tolerance to three herbicides of glyphosate, glufosinate and 2,4-D. In addition, the following plants are also developed: cotton having tolerance to glufosinate and 2,4-D; cotton having tolerance to both glufosinate and dicamba; corn having tolerance to both glyphosate and 2,4-D; soybean having tolerance to both glyphosate and an HPPD herbicide; and genetically modified corn having tolerance to glyphosate, glufosinate, 2,4-D, aryloxyphenoxypropionate-type (FDPs) herbicides and cyclohexadione-type (DIMs) herbicides.

Examples of a commercially available plant imparted with tolerance to herbicides and insect resistance include: corn "YieldGard Roundup Ready" and "YieldGard Roundup Ready 2" each having tolerance to glyphosate and resistance to corn borer; corn "Agrisure CB/LL" having tolerance to glufosinate and resistance to corn borer; corn "Yield Gard VT Root worm/RR2" having tolerance to glyphosate and resistance to corn rootworm; corn "Yield Gard VT Triple" having tolerance to glyphosate and resistance to corn rootworm and corn borer; corn "Herculex I" having tolerance to glufosinate and resistance to a lepidopteran pest (Cry1F) (e.g., resistance to western bean cutworm, corn borer, black cutworm and fall armyworm); corn "YieldGard Corn Rootworm/Roundup Ready 2" having tolerance to glyphosate and resistance to corn rootworm; corn "Agrisure GT/RW" having tolerance to glufosinate and resistance to a coleopteran pest for corn (Cry3A) (e.g., resistance to Western corn rootworm, Northern corn rootworm and Mexican corn rootworm); corn "Herculex RW" having tolerance to glufosinate and resistance to a coleopteran pest (Cry34/35Ab1) (e.g., resistance to Western corn rootworm, Northern corn rootworm and Mexican corn rootworm); corn "Yield Gard VT Root worm/RR2" having tolerance to glyphosate and resistance to corn rootworm; and cotton "Bollgard 3 (registered trademark) XtendFlex (registered trademark)" having tolerance to dicamba, tolerance to glyphosate, tolerance to glufosinate and resistance to a lepidopteran pest (e.g., resistance to ballworms and tobacco budworm, armyworms and the like).

The application rate of the present uracil compound is usually within a range of 1 to 10,000 g per 10,000 $m^2$, preferably 2 to 5,000 g per 10,000 $m^2$, and more preferably 5 to 2,000 g per 10,000 $m^2$.

In the present method, the present uracil compound may be used in combination with the adjuvant.

The type of the adjuvant is not particularly limited, and it is desirable to use in combination with oil-based adjuvants such as Agri-Dex and MSO (Methylated Seed Oils obtained by esterifying mineral oils such as paraffin-based hydrocarbons, naphthene-based hydrocarbons and aromatic hydrocarbons, or vegetable oils (soybean oil and rapeseed oil) at a ratio of 0.25%, 0.5%, 1%, 2%, 3%, 4%, 5% or 6%

(volume/volume) in the spray liquid, or nonionic adjuvants such as Induce (polyoxyalkylene alkyl ether, polyoxyalkylene fatty acid ester, alkyl aryl alkoxylate, or alkyl aryl polyoxyalkylene glycol) at a ratio of 0.05%, 0.1%, 0.25% or 0.5% (volume/volume) in the spray liquid. Other examples include anionic adjuvants such as Gramin S (substituted sulfonate), cationic adjuvants such as Genamin T 200BM (polyoxyethylene amine), and organosilicon-based adjuvants such as Silwett L77. A drift-reducing agent such as Intact (polyoxyethylene glycol) may also be used in combination.

The pH and hardness of the spray liquid prepared when applying the present uracil compound are not particularly limited, and the pH is usually within a range of 5 to 9 and the hardness is usually within a range of 0 to 500 ppm as American hardness.

The period of time for applying the present uracil compound is not particularly limited, and the period of time is usually within a range of 5 a.m. to 9 p.m., the photon flux density is usually 10 to 2,500 μmol/$m^2$/second, the temperature is usually 0 to 35 degrees Celsius, and the wind velocity is usually 3 MPH or less.

The spraying pressure to be employed for the application of the present uracil compound is not particularly limited, and is usually 30 to 120 PSI, and preferably 40 to 80 PSI.

In the present method, the type of the nozzle to be used in the application of the present uracil compound may be a flat fan nozzle or a drift-reducing nozzle. Examples of the flat fan nozzle include products of Teejet 110 series and XR Teejet 110 series manufactured by Teejet. The volume median diameter of liquid droplets ejected through each of the nozzles is usually less than 430 microns at an ordinary spraying pressure, usually 30 to 120 PSI. A drift-reducing nozzle is a nozzle reduced in drift compared with a flat fan nozzle and is called as "air induction nozzle" or "pre-orifice nozzle". The volume median diameter of liquid droplets ejected through the drift-reducing nozzle is usually 430 microns or more.

An air induction nozzle has an air guide part between an inlet (spray liquid introduction part) of the nozzle and an outlet (spray liquid ejection part) of the nozzle, so that liquid droplets filled with air can be formed upon the mixing the spray liquid with air. Examples of the air induction nozzle include: TDXL11003-D, TDXL11004-D1, TDXL11005-D1 and TDXL11006-D manufactured by Green Leaf Technology; TTI110025, TTI11003, TTI11004, TTI11005, TTI11006 and TTI11008 manufactured by Teejet; and ULD120-041, ULD120-051 and ULD120-061 manufactured by Pentair. A particularly desirable one is TTI11004.

A pre-orifice nozzle is a nozzle in which an inlet (a spray liquid introduction part) of the nozzle serves as a metering orifice, so that large liquid droplets can be formed by controlling the flow amount to be flown into the nozzle so as to decrease the pressure in the nozzle. When the pre-orifice nozzle is used, the pressure during the ejection of the spray liquid can be reduced by half compared with the pressure before the introduction of the spray liquid. Examples of the pre-orifice nozzle include: DR110-10, UR110-05, UR110-06, UR110-08 and UR110-10 manufactured by Wilger; and 1/4TTJ08 Turf Jet and 1/4TTJ04 Turf Jet manufactured by Teejet.

Examples of treatment timing for weeds include a foliar treatment for growing weeds or a soil treatment for the place where weeds may grow. When the place where weeds are growing is also the place where weeds may grow, a foliar treatment and a soil treatment can be performed. The treatment timing for weeds is independent of the treatment timing for crops, for example, the foliar treatment for weeds is sometimes performed before sowing crops, or the soil treatment for weeds is sometimes performed during crop growth. The treatment for weeds can be performed uniformly in a blanket manner to the land, or can be a spot treatment.

In the method of the present invention, the spot treatment is the concept opposed to uniform treatment of herbicides in a blanket manner, and means a treatment in which the herbicide is selectively sprayed on the place where weeds are growing or may grow. The term "treatment for place" means a treatment for weeds or soil if weeds are growing, or a treatment for soil at the place where weeds may grow. The case where, the present uracil compound is slightly sprayed on the place where weeds are not growing or may not grow by spray drift or evaporation, is also included in the spot treatment unless it is a blanket treatment. Only the case where, all the places where weeds are growing or may grow are selectively treated in a continuous cultivation field of crops, is not considered as the spot treatment. In other words, even if a part of the cultivation field is treated in a blanket manner, or a part of the place where weeds are growing or may grow is not treated with the present uracil compound, the treatment is included in the spot treatment if a spot-treated place is present in the continuous cultivation field of crops. The spot treatment can be performed while avoiding crops, or can be applied based only on the location of weeds, independent of the location of crops.

Specific examples of the method for spot treatment are shown below. The spot treatment can be performed as follows: in the cultivation field of crops, a spraying person visually sprays the present uracil compound using a hand-held nozzle or a robotic arm nozzle while walking or riding on a device running on the ground or a flying device. The spot treatment can also be performed by mapping the place where weeds are growing or may grow in advance, and spraying the present uracil compound based on map information. In spraying based on map information, the spot treatment can be performed by, in addition to the aforementioned method, automatically or manually opening and closing the nozzle on the boom or the robotic arm nozzle while running or flying of a spraying machine, based on location information of the spraying machine (obtained by GPS) and the map information. The map information can be created based on image information taken by a manned or unmanned flying object, or the map information can be created visually by an observer walking on the ground, an observer riding on a device running on the ground, or an observer riding on a flying device. Furthermore, the running or flying spraying machine has a function to detect the place where weeds are growing or may grow, and the spot treatment can be performed by the boom or robotic arm while performing real-time mapping. These technologies are mentioned in Patent Documents (e.g., WO 2018001893, WO 2018036909) and Non-Patent Documents (e.g., Crop Protection 26, 270-277, Weed Technology 17, 711-717, Applied Engineering in Agriculture. 30, 143-152). These technologies form a part of emerging agriculture called precision agriculture, smart agriculture or digital agriculture, and the non-uniform spray style generated by the spot treatment is also called variable rate application (VRA) as the term in the emerging agriculture. The technology in which a running spraying machine performs the spot treatment in real time while detecting growing weeds is also known as "See & Spray" or "optical spot spray technology (OSST)".

The place where weeds may grow can be estimated based on the fact that the weeds formed a vegetation batch in the past growing season, or it can be estimated from the distribution of buried seeds. The distribution of buried seeds can be examined by soil sampling or estimated by remote sensing.

Examples of the weeds which can be controlled by the present compound include the following weeds, but are not limited thereto.

Urticaceae weeds: small nettle (*Urtica urens*)

Polygonaceae weeds: black bindweed (*Polygonum convolvulus*), pale *Persicaria* (*Polygonum lapathifolium*), Pennsylvania smartweed (*Polygonum pensylvanicum*), redshank (*Polygonum persicaria*), bristly lady's-thumb (*Polygonum longisetum*), knotgrass (*Polygonum aviculare*), equal-leaved knotgrass (*Polygonum arenastrum*), Japanese knotweed (*Polygonum cuspidatum*), Japanese dock (*Rumex japonicus*), curly dock (*Rumex crispus*), blunt-leaved dock (*Rumex obtusifolius*), common sorrel (*Rumex acetosa*)

Portulacaceae weeds: common purslane (*Portulaca oleracea*)

Caryophyllaceae weeds: common chickweed (*Stellaria media*), water chickweed (*Stellaria aquatica*), common mouse-ear (*Cerastium holosteoides*), sticky mouse-ear (*Cerastium* glomeratum), corn spurrey (*Spergula arvensis*), five-wound catchfly (*Silene gallica*)

Molluginaceae weeds: carpetweed (*Mollugo verticillata*)

Chenopodiaceae weeds: common lambsquarters (*Chenopodium album*), Indian goosefoot (*Chenopodium ambrosioides*), *kochia* (*Kochia scoparia*), spiny saltwort (*Salsola kali*), Orach (*Atriplex* spp.)

Amaranthaceae weeds: redroot pigweed (*Amaranthus retroflexus*), slender amaranth (*Amaranthus viridis*), livid amaranth (*Amaranthus lividus*), spiny amaranth (*Amaranthus spinosus*), smooth pigweed (*Amaranthus hybridus*), Palmer amaranth (*Amaranthus palmeri*), green pigweed (*Amaranthus patulus*), waterhemp (*Amaranthus tuberculatus=Amaranthus rudis=Amaranthus tamariscinus*), prostrate pigweed (*Amaranthus blitoides*), large-fruit amaranth (*Amaranthus deflexus*), mucronate amaranth (*Amaranthus quitensis*), alligator weed (*Alternanthera philoxeroides*), sessile alligator weed (*Alternanthera sessilis*), perrotleaf (*Alternanthera tenella*)

Papaveraceae weeds: common poppy (*Papaver rhoeas*), field poppy (*Papaver dubium*), Mexican prickle poppy (*Argemone mexicana*)

Brassicaceae weeds: wild radish (*Raphanus raphanistrum*), radish (*Raphanus sativus*), wild mustard (*Sinapis arvensis*), shepherd's purse (*Capsella* bursa-*pastoris*), white mustard (*Brassica juncea*), oilseed rape (*Brassica napus*), pinnate tansy mustard (*Descurainia pinnata*), marsh yellowcress (*Rorippa islandica*), yellow fieldcress (*Rorippa sylvestris*), field pennycress (*Thlaspi arvense*), turnip weed (*Myagrum rugosum*), Virginia pepperweed (*Lepidium virginicum*), slender wartcress (*Coronopus didymus*)

Capparaceae weeds: African cabbage (*Cleome affinis*)

Fabaceae weeds: Indian joint vetch (*Aeschynomene indica*), zigzag joint vetch (*Aeschynomene rudis*), hemp *sesbania* (*Sesbania exaltata*), sickle pod (*Cassia obtusifolia*), coffee *senna* (*Cassia occidentalis*), *Florida* beggar weed (*Desmodium tortuosum*), wild groundnut (*Desmodium adscendens*), Illinois tick trefoil (*Desmodium illinoense*), white clover (*Trifolium repens*), kudzu (*Pueraria lobata*), narrowleaf vetch (*Vicia angustifolia*), hairy indigo (*Indigofera hirsuta*), *Indigofera truxillensis*, common cowpea (*Vigna sinensis*)

Oxalidaceae weeds: creeping wood sorrel (*Oxalis corniculata*), European wood sorrel (*Oxalis stricta*), purple shamrock (*Oxalis oxyptera*)

Geraniaceae weeds: *Carolina geranium* (*Geranium carolinense*), common storksbill (*Erodium cicutarium*)

Euphorbiaceae weeds: sun spurge (*Euphorbia helioscopia*), annual spurge (*Euphorbia maculata*), prostrate spurge (*Euphorbia humistrata*), Hungarian spurge (*Euphorbia esula*), wild poinsettia (*Euphorbia heterophylla*), hyssop-leaf sandmat (*Euphorbia brasiliensis*), Asian copperleaf (*Acalypha australis*), tropic *croton* (*Croton glandulosus*), lobed *croton* (*Croton lobatus*), long-stalked *phyllanthus* (*Phyllanthus corcovadensis*), castor bean (*Ricinus communis*)

Malvaceae weeds: velvetleaf (*Abutilon theophrasti*), arrow-leaf *sida* (*Sida rhombifolia*), heart-leaf *sida* (*Sida cordifolia*), prickly *sida* (*Sida spinosa*), *Sida glaziovii, Sida santaremnensis*, bladder weed (*Hibiscus trionum*), spurred *anoda* (*Anoda cristata*), spine-seeded false-mallow (*Malvastrum coromandelianum*)

Onagraceae weeds: *Ludwigia* epilobioides, long-fruited primrose willow (*Ludwigia octovalvis*), winged water primrose (*Ludwigia decurrens*), common evening-primrose (*Oenothera biennis*), cutleaf evening-primrose (*Oenothera laciniata*)

Sterculiaceae weeds: *Florida waltheria* (*Waltheria indica*)

Violaceae weeds: field violet; Viola *arvensis*, wild violet; Viola tricolor

Cucurbitaceae weeds: bur cucumber (*Sicyos angulatus*), wild cucumber (*Echinocystis lobata*), bitter balsam apple (*Momordica charantia*)

Lythraceae weeds: *Ammannia multiflora*, eared redstem (*Ammannia auriculata*), scarlet toothcup (*Ammannia coccinea*), purple loosestrife (*Lythrum salicaria*), Indian toothcup (*Rotala indica*)

Elatinaceae weeds: three-stamen waterwort (*Elatine triandra*), California waterwort (*Elatine californica*)

Apiaceae weeds: Chinese celery (*Oenanthe javanica*), wild carrot (*Daucus carota*), carrot fern (*Conium maculatum*)

Araliaceae weeds: lawn pennywort (*Hydrocotyle sibthorpioides*), floating pennywort (*Hydrocotyle ranunculoides*)

Ceratophyllaceae weeds: common hornwort (*Ceratophyllum demersum*)

Cabombaceae weeds: *Carolina* fanwort (*Cabomba caroliniana*)

Haloragaceae weeds: Brazilian water milfoil (*Myriophyllum aquaticum*), whorled water milfoil (*Myriophyllum verticillatum*), water milfoils (*Myriophyllum spicatum, Myriophyllum heterophyllum*, etc.)

Sapindaceae weeds: heartseed (*Cardiospermum halicacabum*)

Primulaceae weeds: scarlet pimpernel (*Anagallis arvensis*)

Asclepiadaceae weeds: common milkweed (*Asclepias syriaca*), honeyvine milkweed (*Ampelamus albidus*)

Rubiaceae weeds: catchweed bedstraw (*Galium aparine*), *Galium spurium* var. echinospermon, broadleaf buttonweed (*Spermacoce latifolia*), Brazil calla lily (*Richardia brasiliensis*), broadleaf buttonweed (*Borreria alata*)

Convolvulaceae weeds: Japanese morning glory (*Ipomoea nil*), ivy-leaf morning glory (*Ipomoea hederacea*), tall morning glory (*Ipomoea purpurea*), entire-leaf morning glory (*Ipomoea hederacea* var. integriuscula), pitted morning glory (*Ipomoea lacunosa*), three-lobe morning glory (*Ipomoea triloba*), blue morning glory (*Ipomoea acumi-

*nata*), scarlet morning glory (*Ipomoea hederifolia*), red morning glory (*Ipomoea coccinea*), cypress-vine morning glory (*Ipomoea quamoclit*), *Ipomoea grandifolia, Ipomoea aristolochiaefolia*, Cairo morning glory (*Ipomoea cairica*), field bindweed (*Convolvulus arvensis*), Japanese false bindweed (*Calystegia hederacea*), Japanese bindweed (*Calystegia japonica*), ivy woodrose (*Merremia hederacea*), hairy woodrose (*Merremia aegyptia*), roadside woodrose (*Merremia cissoides*), small-flower morning glory (*Jacquemontia tamnifolia*)

Boraginaceae weeds: field forget-me-not (*Myosotis arvensis*)

Lamiaceae weeds: purple deadnettle (*Lamium purpureum*), common henbit (*Lamium amplexicaule*), lion's ear (*Leonotis nepetaefolia*), wild spikenard (*Hyptis suaveolens*), *Hyptis lophanta*, Siberian motherwort (*Leonurus sibiricus*), field-nettle betony (*Stachys arvensis*)

Solanaceae weeds: jimsonweed (*Datura stramonium*), black nightshade (*Solanum nigrum*), American black nightshade (*Solanum americanum*), eastern black nightshade (*Solanum ptycanthum*), hairy nightshade (*Solanum sarrachoides*), buffalo bur (*Solanum rostratum*), soda-apple nightshade (*Solanum aculeatissimum*), sticky nightshade (*Solanum sisymbriifolium*), horse nettle (*Solanum carolinense*), cutleaf groundcherry (*Physalis angulata*), smooth groundcherry (*Physalis subglabrata*), apple of Peru (*Nicandra physalodes*)

Scrophulariaceae weeds: ivyleaf speedwell (*Veronica hederaefolia*), common speedwell (*Veronica persica*), corn speedwell (*Veronica arvensis*), common false pimpernel (*Lindernia procumbens*), false pimpernel (*Lindernia dubia*), *Lindernia angustifolia*, round-leaf water hyssop (*Bacopa rotundifolia*), *dopatrium* (*Dopatrium junceum*), *Gratiola japonica*

Plantaginaceae weeds: Asiatic plantain (*Plantago asiatica*), narrow-leaved plantain (*Plantago lanceolata*), broadleaf plantain (*Plantago major*), marsh water starwort (*Callitriche palustris*)

Asteraceae weeds: common cocklebur (*Xanthium pensylvanicum*), large cocklebur (*Xanthium occidentale*), Canada cocklebur (*Xanthium italicum*), common sunflower (*Helianthus annuus*), wild chamomile (*Matricaria chamomilla*), scentless chamomile (*Matricaria perforata*), corn marigold (*Chrysanthemum segetum*), rayless mayweed (*Matricaria matricarioides*), Japanese mugwort (*Artemisia princeps*), common mugwort (*Artemisia vulgaris*), Chinese mugwort (*Artemisia verlotorum*), tall goldenrod (*Solidago altissima*), common dandelion (*Taraxacum officinale*), hairy *galinsoga* (*Galinsoga ciliata*), small-flower *galinsoga* (*Galinsoga parviflora*), common groundsel (*Senecio vulgaris*), flower-of-souls (*Senecio brasiliensis*), *Senecio grisebachii*, fleabane (*Conyza bonariensis*), Guernsey fleabane (*Conyza sumatrensis*), marestail (*Conyza canadensis*), common ragweed (*Ambrosia artemisiifolia*), giant ragweed (*Ambrosia trifida*), three-cleft bur-marigold (*Bidens tripartita*), hairy beggarticks (*Bidens pilosa*), common beggarticks (*Bidens frondosa*), greater beggarticks (*Bidens subalternans*), Canada thistle (*Cirsium arvense*), black thistle (*Cirsium vulgare*), blessed milkthistle (*Silybum marianum*), musk thistle (*Carduus nutans*), prickly lettuce (*Lactuca serriola*), annual sowthistle (*Sonchus oleraceus*), spiny sowthistle (*Sonchus asper*), beach creeping oxeye (*Wedelia glauca*), perfoliate blackfoot (*Melampodium perfoliatum*), red tasselflower (*Emilia sonchifolia*), wild marigold (*Tagetes minuta*), para cress (*Blainvillea latifolia*), coat buttons (*Tridax procumbens*), Bolivian coriander (*Porophyllum ruderale*), Paraguay starbur (*Acanthospermum australe*), bristly starbur (*Acanthospermum hispidum*), balloon vine (*Cardiospermum halicacabum*), tropic *ageratum* (*Ageratum conyzoides*), common boneset (*Eupatorium perfoliatum*), fireweed (*Erechtites hieracifolia*), American cudweed (*Gamochaeta spicata*), linear-leaf cudweed (*Gnaphalium spicatum*), *Jaegeria hirta*, ragweed *parthenium* (*Parthenium hysterophorus*), small yellow crownbeard (*Siegesbeckia orientalis*), lawn burweed (*Soliva sessilis*), white *eclipta* (*Eclipta prostrata*), American false daisy (*Eclipta alba*), spreading sneezeweed (*Centipeda minima*)

Alismataceae weeds: dwarf arrowhead (*Sagittaria pygmaea*), threeleaf arrowhead (*Sagittaria trifolia*), arrowhead (*Sagittaria sagittifolia*), giant arrowhead (*Sagittaria montevidensis*), *Sagittaria aginashi*, channelled water plantain (*Alisma canaliculatum*), common water plantain (*Alisma plantago-aquatica*)

Limnocharitaceae weeds: Sawah flowering rush (*Limnocharis flava*)

Hydrocharitaceae weeds: American frogbit (*Limnobium spongia*), *Florida elodea* (*Hydrilla verticillata*), common water nymph (*Najas guadalupensis*)

Araceae weeds: Nile cabbage (*Pistia stratiotes*)

Lemnaceae weeds: three-nerved duckweed (*Lemna aoukikusa, Lemna paucicostata, Lemna aequinoctialis*), common duckmeat (*Spirodela polyrhiza*), *Wolffia* spp.

Potamogetonaceae weeds: roundleaf pondweed (*Potamogeton distinctus*), pondweeds (*Potamogeton crispus, Potamogeton* illinoensis, *Stuckenia pectinata*, etc.)

Liliaceae weeds: wild onion (*Allium canadense*), wild garlic (*Allium vineale*), Chinese garlic (*Allium macrostemon*)

Pontederiaceae weeds: common water hyacinth (*Eichhornia crassipes*), blue mud plantain (*Heteranthera limosa*), *Monochoria korsakowii*, heartshape false pickerelweed (*Monochoria vaginalis*)

Commelinaceae weeds: common dayflower (*Commelina communis*), tropical spiderwort (*Commelina benghalensis*), erect dayflower (*Commelina erecta*), Asian spiderwort (*Murdannia keisak*)

Poaceae weeds: common barnyardgrass (*Echinochloa crus-galli*), early barnyardgrass (*Echinochloa oryzicola*), barnyard grass (*Echinochloa crus-galli* var *formosensis*), late watergrass (*Echinochloa oryzoides*), jungle rice (*Echinochloa colonum*), Gulf cockspur (*Echinochloa crus-pavonis*), green foxtail (*Setaria viridis*), giant foxtail (*Setaria faberi*), yellow foxtail (*Setaria glauca*), knotroot foxtail (*Setaria geniculata*), southern crabgrass (*Digitaria ciliaris*), large crabgrass (*Digitaria sanguinalis*), Jamaican crabgrass (*Digitaria horizontalis*), sourgrass (*Digitaria insularis*), goosegrass (*Eleusine indica*), annual bluegrass (*Poa annua*), rough-stalked meadowgrass (*Poa trivialis*), Kentucky bluegrass (*Poa pratensis*), short-awn foxtail (*Alopecurus aequalis*), blackgrass (*Alopecurus myosuroides*), wild oat (*Avena fatua*), Johnsongrass (*Sorghum halepense*), shatter cane (grain *sorghum; Sorghum vulgare*), quackgrass (*Agropyron repens*), Italian ryegrass (*Lolium multiflorum*), perennial ryegrass (*Lolium perenne*), bomugi (rigid ryegrass; *Lolium rigidum*), rescue brome (*Bromus catharticus*), downy brome (*Bromus sterilis*), Japanese brome grass (*Bromus japonicus*), cheat (*Bromus secalinus*), cheatgrass (*Bromus tectorum*), foxtail barley (*Hordeum jubatum*), jointed goatgrass (*Aegilops cylindrica*), reed canarygrass (*Phalaris arundinacea*), little-seed canary grass (*Phalaris minor*), silky bentgrass (*Apera spica-venti*), fall *panicum* (*Panicum dichotomiflorum*), Texas *panicum* (*Panicum texanum*), guineagrass (*Panicum maximum*), broadleaf signalgrass (*Brachiaria platyphylla*), Congo signal grass (*Brachiaria ruziziensis*), Alexander grass (*Brachiaria plantaginea*), Surinam grass (*Brachiaria decumbens*), palisade grass (*Brachiaria brizantha*), creeping signalgrass (*Brachiaria humidicola*), southern sandbur (*Cenchrus echinatus*), field sandbur (*Cenchrus pauciflorus*), woolly cupgrass (*Eriochloa villosa*), feathery *pennisetum* (*Pennisetum setosum*), Rhodes grass (*Chloris gayana*), feathertop Rhodes grass (*Chloris virgata*), India lovegrass (*Eragrostis pilosa*), Natal grass (*Rhynchelytrum repens*), crowfoot grass (*Dactyloctenium aegyptium*), winkle grass (*Ischaemum rugosum*), swamp millet (*Isachne globosa*), common rice (*Oryza sativa*), bahiagrass (*Paspalum notatum*), coastal sand *paspalum* (*Paspalum maritimum*), mercergrass (*Paspalum distichum*), kikuyugrass (*Pennisetum clandestinum*), West Indies *pennisetum* (*Pennisetum setosum*), itch grass (*Rottboellia cochinchinensis*), Asian sprangletop (*Leptochloa chinensis*), salt-meadow grass (*Leptochloa fascicularis*), Christmas-tree grass (*Leptochloa filiformis*), Amazon sprangletop (*Leptochloa panicoides*), Japanese cutgrass (*Leersia japonica*), *Leersia* sayanuka, cutgrass (*Leersia oryzoides*), *Glyceria leptorrhiza*, sharpscale mannagrass (*Glyceria acutiflora*), great watergrass (*Glyceria maxima*), redtop (*Agrostis gigantea*), carpet bent (*Agrostis stolonifera*), Bermuda grass (*Cynodon dactylon*), cocksfoot (*Dactylis glomerata*), centipede grass (*Eremochloa ophiuroides*), tall fescue (*Festuca arundinacea*), red fescue (*Festuca rubra*), lalang (*Imperata cylindrica*), Chinese fairy grass (*Miscanthus sinensis*), switchgrass (*Panicum virgatum*), Japanese lawngrass (*Zoysia japonica*)

Cyperaceae weeds: Asian flatsedge (*Cyperus microiria*), rice flatsedge (*Cyperus iria*), hedgehog *cyperus* (*Cyperus compressus*), small-flowered nutsedge (*Cyperus difformis*), lax-flat sedge (*Cyperus flaccidus*), *Cyperus globosus, Cyperus nipponicus*, fragrant flatsedge (*Cyperus odoratus*), mountain nutsedge (*Cyperus serotinus*), purple nutsedge (*Cyperus rotundus*), yellow nutsedge (*Cyperus esculentus*), pasture spike sedge (*Kyllinga gracillima*), green *kyllinga* (*Kyllinga brevifolia*), grasslike *fimbristylis* (*Fimbristylis miliacea*), annual fringerush (*Fimbristylis dichotoma*), slender spikerush (*Eleocharis acicularis*), *Eleocharis kuroguwai*, Japanese bulrush (*Schoenoplectiella hotarui*), hardstem bulrush (*Schoenoplectiella juncoides*), *Schoenoplectiella wallichii*, rough-seed bulrush (*Schoenoplectiella mucronatus*), *Schoenoplectiella triangulatus, Schoenoplectiella nipponicus*, triangular club-rush (*Schoenoplectiella triqueter*), *Bolboschoenus koshevnikovii*, river bulrush (*Bolboschoenus fluviatilis*)

Equisetaceae weeds: field horsetail (*Equisetum arvense*), marsh horsetail (*Equisetum palustre*)

Salviniaceae weeds: floating fern (*Salvinia natans*)

Azollaceae weeds: Japanese mosquitofern (*Azolla japonica*), feathered mosquito fern (*Azolla pinnata*)

Marsileaceae weeds: clover fern (*Marsilea quadrifolia*)

Other: Filamentous algae (Pithophora, Cladophora), Bryophyta, Marchantiophyta, Anthocerotophyta, Cyanobacteria, Pteridophyta, sucker of perennial crop (pome fruits, stone fruits, berry fruits, nuts, citrus fruits, hops, grapes, etc.)

In the present invention, the resistance mechanism of PPO inhibitor-resistant weeds as control targets may be either target-site resistance due to target-site mutation, or non-target-site resistance due to target-site mutation. Examples of the target-site mutation include one or multiple amino acid substitutions selected from the group consisting of Arg128Leu, Arg128Met, Arg128Gly, Arg128His, Arg128Ala, Arg128Cys, Arg128Glu, Arg128Ile, Arg128Lys, Arg128Asn, Arg128Gln, Arg128Ser, Arg128Thr, Arg128Val, Arg128Tyr, Gly210 deletion, Ala210 deletion, Gly210Thr, Ala210Thr, G211 deletion, Gly114Glu, Ser149Ile and Gly399Ala (all of amino acid numbers are standardized by sequence of PPO2 of palmer amaranth (*Amaranthus palmeri*)) in PPO. The above PPO inhibitor-resistant weeds are known as weeds having resistance to carfentrazone-ethyl, fomesafen or lactofen. PPO means protoporphyrinogen oxidase. PPO in a weed includes PPO1 and PPO2. The above-mentioned mutation may occur in either PPO1 or PPO2, or may also occur in both of PPO1 and PPO2. The present invention is preferable for a method for controlling the PPO inhibitor-resistant weeds having the mutation in PPO2.

For example, Arg128Met mutation means that a mutation occurs in an amino acid residue located at position-128. Examples of the PPO inhibitor-resistant weeds are shown below. Palmer amaranth (*Amaranthus palmeri*) having an Arg128Met mutation in PPO2 is known (Pest Management Science 73, 1559-1563). Palmer amaranth (*Amaranthus palmeri*) having an Arg128Gly mutation in PPO2 is known (Pest Management Science 73, 1559-1563). Waterhemp (*Amaranthus tuberculatus=Amaranthus rudis=Amaranthus tamariscinus*) having an Arg128Gly mutation in PPO2 is known (Pest Management Science, doi: 10.1002/ps.5445). Waterhemp (*Amaranthus tuberculatus=Amaranthus rudis=Amaranthus tamariscinus*) having an Arg128Ile mutation in PPO2 and waterhemp (*Amaranthus tuberculatus=Amaranthus rudis=Amaranthus tamariscinus*) having an Arg128Lys mutation in PPO2 are respectively known (Pest Management Science, doi: 10.1002/ps.5445). Rigid ryegrass (*Lolium rigidum*) having a mutation corresponding to Arg128His in PPO2 (rigid ryegrass (*Lolium rigidum*) having an Arg132His mutation in PPO2) is known (WSSA annual meeting, 2018). Palmer amaranth (*Amaranthus palmeri*) having a Gly399Ala mutation in PPO2 is known (Frontiers in Plant Science 10, Article 568). Goosegrass (*Eleusine indica*) having a mutation corresponding to Ala210Thr in PPO1 (goosegrass (*Eleusine indica*) having an Ala212Thr mutation in PPO1) is known (WSSA annual meeting, 2019). According to the present invention, PPO inhibitor-resistant weeds each having one of the above-mentioned target-site mutations can be controlled effectively. However, the PPO inhibitor-resistant weeds to be controlled is not limited to these weeds. Namely, not only palmer amaranth (*Amaranthus palmeri*) having the present target-site mutation in either PPO1 or PPO2 or both of them can be controlled effectively, but also, for example, waterhemp (*Amaranthus tuberculatus=Amaranthus rudis=Amaranthus tamariscinus*) having the present target-site mutation, common ragweed (*Ambrosia artemisiifolia*) having the present target-site mutation, rigid ryegrass (*Lolium rigidum*) having the present target-site mutation, Italian ryegrass (*Lolium multiflorum*) having the present target-site mutation and wild poinsettia (*Euphorbia cyathophora*) having the present target-site mutation can be controlled effectively.

The above PPO inhibitor-resistant weeds as control targets of the present invention may have resistance to PPO inhibitors due to non-target-site mutation. Examples of the reduced sensitivity of weeds due to non-target-site mutation include waterhemp (*Amaranthus tuberculatus=Amaranthus rudis=Amaranthus tamariscinus*) and palmer amaranth (*Amaranthus palmeri*) which become resistant to a PPO inhibitor as the result of the involvement of CYP or GST, and specifically, for example, waterhemp (*Amaranthus tuberculatus=Amaranthus rudis=Amaranthus tamariscinus*) which becomes resistant to carfentrazone-ethyl is known (PLOS ONE, doi: 10.1371/journal.pone.0215431). Even if the above PPO inhibitor-resistant weeds have resistance to herbicides due to non-target-site mutation, the weeds are effectively controlled according to the present invention.

In the present invention, the above PPO inhibitor-resistant weeds can be controlled by applying the present uracil compound in the cultivation field in crops. Here, the above PPO inhibitor-resistant weeds are not those having resistance to the present uracil compound to be applied. In the above PPO inhibitor-resistant weeds, intra-specific variations in traits other than resistance to PPO inhibitors are not particularly limited. Namely, the weeds may have both traits of reduced sensitivity and resistance to a particular herbicide other than PPO inhibitors. The reduced sensitivity and resistance may be attributed to target-site mutation where mutation occurs at a target-site, or may be attributed to non-target-site mutation.

Examples of the non-target-site mutation include metabolic enhancement, defective absorption, defective transition, extrusion and the like. Examples of the factor of the metabolic enhancement include enhanced activity of metabolic enzymes such as cytochrome P450 monooxygenases, aryl acylamidases, esterases and glutathione S-transferase. The extrusion includes the transportation to a vacuole by an ABC transporter.

Examples of the target-site mutation include the substitution of one amino acid residue or multiple amino acid residues selected from the below-mentioned amino acid residues in ALS gene.

Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Arg377His, Trp574Leu, Trp574Gly, Trp574Met, Ser653Thr, Ser653Thr, Ser653Asn, Ser635Ile, Gly654Glu and Gly645Asp.

Examples of the reduced sensitivity of weeds due to target-site mutation include reduced sensitivity due to the substitution of one amino acid residue or multiple amino acid residues selected from the below-mentioned amino acid residues in ACCase gene.

Ile1781Leu, Ile1781Val, Ile1781Thr, Trp1999Cys, Trp1999Leu, Ala2004Val, Trp2027Cys, Ile2041Asn, Ile2041Val, Asp2078Gly, Cys2088Arg and Gly2096Ala.

Similarly, examples of the reduced sensitivity of weeds due to target-site mutation include the substitution of amino acid residues such as Thr102Ile, Pro106Ser, Pro106Ala, Pro106Leu and Pro106Thr in EPSPS gene. Particularly, those with substitution of amino acid residues of both of Thr102Ile and Pro106Ser, and those with substitution of amino acid residues of both of Thr102Ile and Pro106Thr are mentioned. Even if glyphosate-resistant goosegrass, Italian ryegrass, rigid ryegrass, perennial ryegrass, sourgrass, waterhemp, *Bidens subalternans*, jungle rice and the like each having substitution of one amino acid residue or multiple amino acid residues among the above-mentioned amino acid residues have further the present target-site mutation in PPO, they can be controlled effectively. Similarly, examples of the reduced sensitivity of weeds due to target-site mutation include an increased number of copies of EPSPS gene, and thus glyphosate-resistant palmer amaranth, waterhemp, summer cypress and the like can also be controlled effectively, even if they have further resistance to PPO inhibitors as described above. Glyphosate-resistant Canadian horseweed, Sumatran fleabane and flax-leaf fleabane in which an ABC transporter is involved can also be controlled effectively, even if they have further resistance to PPO inhibitors. Further, as an example of the reduced sensitivity of weeds due to non-target-site mutation, jungle rice in which sensitivity to glyphosate is reduced by increasing expression of aldo-keto reductase is known (Plant Physiology 181, 1519-1534), and such jungle rice can be effectively controlled, even if it has further resistance to PPO inhibitors.

In the present invention, agrochemical active ingredients such as insecticides, nematicides, fungicides, and plant growth regulators may be applied to crop seeds. In the present invention, examples of the agrochemical active ingredients which may be applied to the crop seeds include one or more agrochemical active ingredients selected from Group A consisting of neonicotinoid-based compounds (A-1), diamide-based compounds (A-2), carbamate-based compounds (A-3), organophosphorus-based compounds (A-4), biological nematicides (A-5), other insecticide compounds and nematicide compounds (A-6), azole-based compounds (A-7), strobilurin-based compounds (A-8), metalaxyl-based compounds (A-9), SDHI compounds (A-10), plant growth regulators (A-11), and other fungicide compounds (A-12).

In the present invention, examples of the neonicotinoid-based compounds (A-1) which may be applied to the crop seeds include the following compounds:

clothianidin, imidacloprid, nitenpyram, acetamiprid, thiamethoxam, flupyradifurone, sulfoxaflor, triflumezopyrim, dicloromezotiaz, thiacloprid and dinotefuran.

In the present invention, examples of the diamide-based compounds (A-2) which may be applied to the crop seeds include the following compounds:

flubendiamide, chlorantraniliprole, cyantraniliprole, cyclaniliprole, broflanilide, tetraniliprole and cyhalodiamide.

In the present invention, examples of the carbamate-based compounds (A-3) which may be applied to the crop seeds include the following compounds:

aldicarb, oxamyl, thiodicarb, carbofuran, carbosulfan and dimethoate.

In the present invention, examples of the organophosphorus-based compounds (A-4) which may be applied to the crop seeds include the following compounds: fenamiphos, imicyafos, fensulfothion, terbufos, fosthiazate, phosphocarb, dichlofenthion, isamidofos, isazophos, ethoprophos, cadusafos, chlorpyrifos, heterofos, mecarphon, phorate, thionazin, triazophos, diamidafos, fosthietan and phosphamidon.

In the present invention, examples of the biological nematicides (A-5) which may be applied to the crop seeds include the following proteins and microorganisms: Harpin Protein, *Pasteuria nishizawae, Pasteuria penetrans, Pasteuria usage, Myrothecium verrucaria, Burholderia cepacia, Bacillus chitonosporus, Paecilomyces lilacinus, Bacillus amyloliquefaciens, Bacillus firmus, Bacillus subtillis, Bacillus pumulis, Trichoderma harzianum, Hirsutella rhossiliensis, Hirsutella minnesotensis, Verticillium chlamydosporum* and *Arthrobotrys dactyloides*.

In the present invention, examples of the other insecticide compounds and nematicide compounds (A-6) which may be applied to the crop seeds include the following compounds:

fipronil, ethiprole, beta-cyfluthrin, tefluthrin, chlorpyrifos, abamectin, spirotetramat, tioxazafen, fluazaindolizine, fluensulfone and fluxametamide.

In the present invention, examples of the azole-based compounds (A-7) which may be applied to the crop seeds include the following compounds:

azaconazole, bitertanol, bromuconazole, cyproconazole, difenoconazole, diniconazole, epoxyconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimenol, triticonazole, fenarimol, nuarimol, pyrifenox, imazalil, oxpoconazole fumarate, pefurazoate, prochloraz, triflumizole, ipfentrifluconazole and mefentrifluconazole.

In the present invention, examples of the strobilurin-based compounds (A-8) which may be applied to the crop seeds include the following compounds:

kresoxim-methyl, azoxystrobin, trifloxystrobin, fluoxastrobin, picoxystrobin, pyraclostrobin, dimoxystrobin, pyribencarb, metominostrobin, orysastrobin and mandestrobin.

In the present invention, examples of the metalaxyl-based compounds (A-9) which may be applied to the crop seeds include the following compounds:

metalaxyl and metalaxyl-M or mefenoxam.

In the present invention, examples of the SDHI compounds (A-10) which may be applied to the crop seeds include the following compounds:

sedaxane, penflufen, carboxin, boscalid, furametpyr, flutolanil, fluxapyroxad, isopyrazam, fluopyram, isofetamid, pyraziflumid, pydiflumetofen, fluindapyr, inpyrfluxam and thifluzamide.

In the present invention, examples of the plant growth regulators (A-11) which may be applied to the crop seeds include the following compounds:

ethephon, chlormequat-chloride, mepiquat-chloride and 4-oxo-4-(2-phenylethyl) aminobutyric acid (hereinafter sometimes referred to as "Compound 2").

In the present invention, examples of the other fungicide compounds (A-12) which may be applied to the crop seeds include the following compounds:

tolclophos-methyl, thiram, Captan, carbendazim, thiophanate-methyl, mancozeb, thiabendazole, isotianil, triazoxide, picarbutrazox and oxathiapiprolin.

All of the agrochemical active ingredients constituting the above Group A are known and can be synthesized according to known technical literatures, and can be also used by purchasing commercially available formulations and standard products.

In the present invention, insecticides and/or fungicides may be foliar-treated for crops in a growth period of the crops. Specifically, one or more compounds selected from Group B consisting of strobilurin-based compounds (B-1), azole-based compounds (B-2), SDHI compounds (B-3), other fungicide compounds (B-4), pyrethroid-based compounds (B-5), benzoylphenylurea compounds (B-6), organophosphorus-based insecticide compounds (B-7), neonicotinoid-based compounds (B-8), and diamide-based compounds (B-9) may be foliar-treated for crops.

In the present invention, examples of the strobilurin-based compounds (B-1) foliar-treated in the growth period of crops include the following compounds:

pyraclostrobin, azoxystrobin, mandestrobin, trifloxystrobin and picoxystrobin.

In the present invention, examples of the azole-based compounds (B-2) foliar-treated in the growth period of crops include the following compounds:

prothioconazole, epoxiconazole, tebuconazole, cyproconazole, propiconazole, metconazole, bromuconazole, tetraconazole, triticonazole, ipfentrifluconazole and mefentrifluconazole.

In the present invention, examples of the SDHI compounds (B-3) foliar-treated in the growth period of crops include the following compounds:

benzovindiflupyr, bixafen, fluxapyroxad, fluindapyr and inpyrfluxam.

In the present invention, examples of the other fungicide compounds (B-4) foliar-treated in the growth period of crops include the following compounds:

tolclophos-methyl and ethaboxam.

In the present invention, examples of the pyrethroid-based compounds (B-5) foliar-treated in the growth period of crops include the following compounds:

bifenthrin, lambda-cyhalothrin, gamma-cyhalothrin, cypermethrin, fenpropathrin, etofenprox, silafluofen and esfenvalerate.

In the present invention, examples of the benzoylphenylurea compounds (B-6) foliar-treated in the growth period of crops include the following compounds: teflubenzuron and triflumuron.

In the present invention, examples of the organophosphorus-based insecticide compounds (B-7) foliar-treated in the growth period of crops include the following compounds:

acephate and methomyl.

In the present invention, examples of the neonicotinoid-based compounds (B-8) foliar-treated in the growth period of crops include the following compounds: imidacloprid, clothianidin, thiamethoxam, sulfoxaflor, flupyradifurone, triflumezopyrim and dicloromezotiaz.

In the present invention, examples of the diamide-based compounds (B-9) foliar-treated in the growth period of crops include the following compounds:

flubendiamide, chlorantraniliprole, cyantraniliprole, broflanilide, tetraniliprole and cyhalodiamide.

Each of the compounds encompassed in the above-mentioned Group B is publicly known and can be synthesized according to known technical literatures, and can be also used by purchasing commercially available formulations and standard products.

In the present invention, in the case where one or more agrochemical active ingredients selected from the above-mentioned Group A are applied to crop seeds, the agrochemical active ingredients are usually formulated by mixing with a carrier such as a solid carrier and a liquid carrier, and adding adjuvants for formulation such as surfactant as necessary. The formulation is preferably an aqueous liquid formulation such as suspension concentrate and water-based emulsion.

In the present invention, as a formulation to be applied to the crop seeds, a formulation containing one type of agrochemical active ingredient may be used alone, or a combination of two or more type of formulations each containing one type of agrochemical active ingredient may be used, or a formulation containing two or more types of agrochemical active ingredients may be used.

The amount of the agrochemical active ingredient applied to the seeds is usually within a range of 0.2 to 5,000 g, and preferably 0.5 to 1,000 g per 100 kg of seeds. Examples of the method for applying the agrochemical active ingredient to the seeds include a method of powder-coating the seeds with a formulation containing the agrochemical active ingredient, a method of immersing the seeds in a formulation containing the agrochemical active ingredient, a method of spraying a formulation containing the agrochemical active ingredient to the seeds, and a method of coating the seeds with a formulation containing the agrochemical active ingredient.

In the present invention, the present uracil compound is applied to the cultivation field before, simultaneously with and/or after seeding crop seeds.

The cultivation field of crops in the present invention may be a place where the crops are cultivated, and not particularly limited to, but examples thereof include a crop field, a paddy field, a land under perennial crops, a seedling tray, a seedling box and a seedling place.

In the present invention, the crop seeds are seeded in a cultivation field by a usual method. The method of the present invention for controlling the herbicide-resistant weeds comprises a step of applying the uracil compound before, simultaneously with and/or after seeding crop seeds. That is, the number of the treatments with the present uracil compound may include once before, simultaneously with, or after seeding crop seeds; twice except before seeding crop seeds, twice except simultaneously with seeding crop seeds, or twice except after seeding crop seeds; or three times at all timings of before seeding crop seeds, simultaneously with seeding crop seeds, and after seeding crop seeds.

In the case where the present uracil compound is applied before seeding crop seeds, the present uracil compound is applied from 50 days before seeding to immediately before seeding, preferably from 30 days before seeding to immediately before seeding, more preferably from 20 days before seeding to immediately before seeding, and still more preferably from 10 days before seeding to immediately before seeding.

In the case where the present uracil compound is applied after seeding crop seeds, the present uracil compound is applied usually from immediately after seeding to before flowering. The present uracil compound is applied more preferably from immediately after seeding to before sprouting, or from 1 to 6 leaf stages of crops. In the case where the present uracil compound is foliar-treated in 1 to 6 leaf stages of crops, the present uracil compound may be used in admixture with one or more compounds selected from the above Group B, or a foliar treatment of the present uracil compound may be performed sequentially before or after a foliar treatment of one or more compounds selected from the above Group B. In the case of sequential application, the order of application of the present uracil compound and application of one or more compounds selected from the above Group B is not particularly limited.

The case where the present uracil compound is applied simultaneously with seeding the crop seeds is the case where a sowing machine and a spraying machine are integrated with each other.

In the present invention, in the case where one or more compounds selected from the above Group B are foliar-treated for crops, the compounds are usually formulated by mixing with a carrier such as a solid carrier and a liquid carrier, and adding adjuvants for formulation such as surfactant as necessary. The formulation type is preferably an emulsifiable concentrate, a suspension concentrate and a soluble liquid.

In the present invention, in the case where one or more compounds selected from the above Group B are foliar-treated in growth period of crops, the one or more compounds selected from the above Group B are applied from 10 days after seeding to 120 days after seeding, and preferably from 21 days after seeding to 90 days after seeding. In the case where a plural of compounds selected from the above Group B are applied, a plural of formulations each containing one compound may be used, and in that case, the formulations are used in admixture with each other, or the formulations are applied sequentially. Further, a mixed formulation containing a plural of compounds may be used.

The application rate of one or more compounds selected from the above Group B is usually within a range of 5 to 5,000 g per 10,000 $m^2$, preferably 20 to 2,000 g per 10,000 $m^2$, and more preferably 500 to 1,500 g per 10,000 $m^2$. Further, in the case where one or more compounds selected from the above Group B are applied, the one or more compounds selected from the above Group B may be mixed with an adjuvant and the mixture may be applied.

In the present invention, in the case where the present uracil compound is applied, one or more other herbicides, plant growth regulators and/or safeners can be used in combination with the present uracil compound. Here, the combination use may be any one of use in admixture (tank mix), use of mixed formulation (premix), and sequential application. In the case of sequential application, the order of application is not particularly limited.

Examples of the herbicides and safeners include the following compounds.

Herbicides:

2,3,6-TBA (2,3,6-trichlorobenzoic acid), 2,3,6-TBA-dimethylammonium, 2,3,6-TBA-lithium, 2,3,6-TEA-potassium, 2,3,6-TBA-sodium, 2,4-D, 2,4-D choline salt, 2,4-D-biproamine, 2,4-D-doboxyl, 2,4-D-2-ethylhexyl, 2,4-D-3-butoxypropyl, 2,4-D-ammonium, 2,4-D-butotyl, 2,4-D-butyl, 2,4-D-diethylammonium, 2,4-D-dimethylammonium, 2,4-D-diolamine, 2,4-D-dodecylammonium, 2,4-D-ethyl, 2,4-D-heptylammonium, 2,4-D-isobutyl, 2,4-D-isooctyl, 2,4-D-isopropyl, 2,4-D-isopropylammonium, 2,4-D-lithium, 2,4-D-mepty, 2,4-D-methyl, 2,4-D-octyl, 2,4-D-pentyl, 2,4-D-propyl, 2,4-D-sodium, 2,4-D-tefuryl, 2,4-D-tetradecylammonium, 2,4-D-triethylammonium, 2,4-D-tris (2-hydroxypropyl)ammonium, 2,4-D-trolamine, 2,4-DB, 2,4-DB choline salt, 2,4-DB-biproamine, 2,4-DB-butyl, 2,4-DB-dimethylammonium, 2,4-DB-isoctyl, 2,4-DB-potassium, 2,4-DB-sodium, acetochlor, acifluorfen, acifluorfen-sodium, aclonifen, ACN (2-amino-3-chloronaphthalene-1, 4-dione), alachlor, allidochlor, alloxydim, ametryn, amicarbazone, amidosulfuron, aminocyclopyrachlor, aminocyclopyrachlor-methyl, aminocyclopyrachlor-potassium, aminopyralid, aminopyralid choline salt, aminopyralid-potassium, aminopyralid-tripromine, amiprophos-methyl, amitrole, anilofos, asulam, atrazine, azafenidin, azimsulfuron, beflubutamid, benazolin-ethyl, bencarbazone, benfluralin, benfuresate, bensulfuron, bensulfuron-methyl, bensulide, bentazon, benthiocarb, benzfendizone, benzobicyclon, benzofenap, benzthiazuron, bialafos, bialaphos, bicyclopyrone, bifenox, bispyribac, bispyribac-sodium, bixlozone, bromacil, bromobutide, bromofenoxim, bromoxynil, bromoxynil-octanoate, butachlor, butafenacil, butamifos, butralin, butroxydim, butylate, cafenstrole, carbetamide, carfentrazone, carfentrazone-ethyl, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamid, cinidon, cinidon-ethyl, cinmethylin, cinosulfuron, clethodim, clodinafop, clodinafop-propargyl, clomazone, clomeprop, clopyralid, clopyralid choline salt, clopyralid-methyl, clopyralid-olamine, clopyralid-potassium, clopyralid-tris(2-hydroxypropyl)ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, di-allate, dicamba, dicamba choline salt, dicamba-biproamine, dicamba-trolamine, dicamba-diglycolamine, dicamba-dimethylammonium, dicamba-diolamine, dicamba-isopropylammonium, dicamba-methyl, dicamba-olamine, dicamba-potassium, dicamba-sodium, dichlobenil, dichlorprop, dichlorprop choline salt, dichlorprop-biproamine, dichlorprop-etexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P-biproamine, dichlorprop-P-etexyl, dichlorprop-P-dimethylammonium, dichlorprop-potassium, dichlorprop-sodium, diclofop, diclofop-methyl, diclosulam, difenoxuron, difenzoquat, difenzoquat metilsulfate, diflufenican, diflufenzopyr, diflufenzopyr-sodium, dimefuron, dimepiperate, dimethachlor, dimethametryn, dimethenamid, dimethenamid-P, dimepiperate, dinitramine, dinoseb, dinoterb, diphenamid, diquat, diquat-dibromide, DSMA (disodium methylarsonate), dithiopyr, diuron, DNOC (2-methyl-4,6-dinitrophenol), esprocarb, epyrifenacil, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium, flucetosulfuron, flufenacet, flufenpyr, flufenpyr-ethyl, flumetsulam, flumetsulam, flumiclorac, flumiclorac-pentyl, flumioxazin, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-butometyl, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P, glufosinate-P-ammonium, glufosinate-P-sodium, glyphosate, glyphosate choline salt, glyphosate-isopropylammonium, glyphosate-biproamine, glyphosate-ammonium, glyphosate-diammonium, glyphosate-potassium, glyphosate-sodium, glyphosate-trimesium, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-ammonium, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lactofen, lenacil, linuron, maleic hydrazide, MCPA (2-(4-chloro-2-methylphenoxy)acetic acid), MCPA choline salt, MCPA-biproamine, MCPA-etexyl, MCPA-butotyl, MCPA-butyl, MCPA-dimethylammonium, MCPA-diolamine, MCPA-ethyl, MCPA-isobutyl, MCPA-isoctyl, MCPA-isopropyl, MCPA-methyl, MCPA-olamine, MCPA-sodium, MCPA-trolamine, MCPB (4-(4-chloro-2-methylphenoxy) butanoic acid), MCPB choline salt, MCPB-biproamine, MCPB-ethyl, MCPB-methyl, MCPB-sodium, mecoprop, mecoprop choline salt, mecoprop-biproamine, mecoprop-2-ethylhexyl, mecoprop-dimethylammonium, mecoprop-diolamine, mecoprop-ethadyl, mecoprop-isoctyl, mecoprop-methyl, mecoprop-potassium, mecoprop-sodium, mecoprop-trolamine, mecoprop-P, mecoprop-P choline salt, mecoprop-P-2-ethylhexyl, mecoprop-P-dimethylammonium, mecoprop-P-isobutyl, mecoprop-P-potassium, mefenacet, mesosulfuron, mesosulfuron-methyl, mesotrione, metam, metamifop, metamitron, metazachlor, metazosulfuron, methabenzthiazuron, methiozolin, methyldymuron, metobromuron, metolachlor, metosulam, metoxuron, metribuzin, metsulfuron, metsulfuron-methyl, molinate, monolinuron, naproanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picloram, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen-ethyl, pyrasulfotole, pyrazolynate, pyrazosulfuron, pyrazosulfuron-ethyl, pyrazoxyfen, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quizalofop, quizalofop-ethyl, quizalofop-tefuryl, quizalofop-P, quizalofop-P-ethyl, quizalofop-P-tefuryl, rimsulfuron, saflufenacil, sethoxydim, EPIC (S-ethyl N,N-dipropylcarbamothioate), siduron, simazine, simetryn, S-metolachlor, MSMA (sodium hydrogen methylarsonate), sulcotrione, sulfentrazone, sulfometuron, sulfometuron-methyl, sulfosulfuron, swep, TCA (2,2,2-trichloroacetic acid, TCA-ammonium, TCA-calcium, TCA-ethadyl, TCA-magnesium, TCA-sodium, tebutam, tebuthiuron, tefuryltrione, tembotrione, tepraloxydim, terbacil, terbumeton, terbuthylazine, terbutryn, tetflupyrolimet, thaxtomin A, thenylchlor, thiazopyr, thidiazimin, thiencarbazone, thiencarbazone-methyl, thifensulfuron, thifensulfuron-methyl, tiafenacil, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium, trifludimoxazin, trifluralin, triflusulfuron, triflusulfuron-methyl, tritosulfuron, vernolate, 4-(4-fluorophenyl)-6-[(2-hydroxy-6-oxo-1-cyclohexen-1-yl)carbonyl]-2-methyl-1,2,4-triazine-3,5(2H,4H)-dione, 2-chloro-N-(1-methyl-1H-tetrazol-5-yl)-3-(methylthio)-4-(trifluoromethyl)benzamide, 2-methyl-N-(5-methyl-1,3,4-oxadiazol-2-yl)-3-(methanesulfonyl)-4-(trifluoromethyl)benzamide, 4-amino-3-chloro-5-fluoro-6-(7-fluoro-1H-indol-6-yl)pyrdine-2-carboxylic acid, cyanomethyl 4-amino-3-chloro-5-fluoro-6-(7-fluoro-1H-indol-6-yl) pyrdine-2-carboxylate, methyl (2R,4R)-4-({[(5S)-3-(3,5-difluorophenyl)-5-vinyl-4,5-dihydroisoxazol-5-yl] carbonyl}amino)tetrahydrofuran-2-carboxylate, methyl (2S,4S)-4-({[(5R)-3-(3,5-difluorophenyl)-5-vinyl-4,5-dihydroisoxazol-5-yl]carbonyl}amino)tetrahydrofuran-2-carboxylate, 3-[(isopropylsulfonyl)methyl]-N-(5-methyl-1,3,4-oxadiazol-2-yl)-5-(trifluoromethyl)-1,2,4-triazoloro [4,3-a]pyridine-8-carboxamine, 1-{2-chloro-6-[(5-chloropyrimidin-2-yl)oxy]phenyl}-4,4,4-trifluorobutan-1-one, 5-chloro-2-{3-chloro-2-[3-(difluoromethyl) isoxazol-5-yl]phenoxy}pyrimidine.

Safeners:

allidochlor, benoxacor, cloquintocet, cloquintocet-mexyl, cyometrinil, cyprosulfamide, dichlormid, dicyclonone, dimepiperate, disulfoton, daiymuron, fenchlorazole, fenchlorazole-ethyl, fenclorim, flurazole, furilazole, fluxofenim, hexim, isoxadifen, isoxadifen-ethyl, mecoprop, mefenpyr, mefenpyr-ethyl, mefenpyr-diethyl, mephenate, metcamifen, oxabetrinil, 1,8-naphthalic anhydride, 1,8-octamethylene diamine, AD-67 (4-(dichloroacetyl)-1-oxa-4-azaspiro[4.5]decane), MCPA (2-(4-chloro-2-methylphenoxy) acetic acid), CL-304415 (4-carboxy-3,4-dihydro-2H-1-benzopyran-4-acetic acid), CSB (1-bromo-4-[(chloromethyl)sulfonyl]benzene), DKA-24 (2,2-dichloro-N-[2-oxo-2-(2-propenylamino)ethyl]-N-(2-propenyl)acetamide), MG191 (2-(dichloromethyl)-2-methyl-1,3-dioxolane), MG-838 (2-propenyl 1-oxa-4-azaspiro[4.5]decane-4-carbodithioate), PPG-1292 (2,2-dichloro-N-(1,3-dioxan-2-ylmethyl)-N-(2-propenyl)acetamide), R-28725 (3-(dichloroacetyl)-2,2-dimethyl-1,3-oxazolidine), R-29148 (3-(dichloroacetyl)-2,2,5-trimethyl-1,3-oxazolidine), and TI-35 (1-(dichloroacetyl)azepane).

In the present invention, particularly preferable examples of the herbicides to be used in combination with the present uracil compound include glyphosate-potassium salt, glyphosate-dimethylamine salt, glyphosate-monoethanolamine salt, glyphosate-isopropylammonium salt, glufosinate-ammonium salt, glufosinate-P-ammonium salt, flumiclorac-pentyl, clethodim, lactofen, S-metolachlor, metribuzin, flufenacet, nicosulfuron, rimsulfuron, acetochlor, mesotrione, isoxaflutole, chlorimuron-ethyl, thifensulfuron-methyl, cloransulam-methyl, imazethapyr-ammonium salt, flumioxazin, epirifenacil, saflufenacil, and trifludimoxazin.

In the present invention, particularly preferable examples of the safeners to be used in combination with the present uracil compound include cyprosulfamide, benoxacor, dichlormid and furilazole.

In the case where the present uracil compound is used in combination with the other herbicides and/or safeners, examples of combination of the present uracil compound and the other herbicides and/or safeners are listed below, but are not limited thereto. In each of the combinations, a weight ratio of the compound to be combined with the present uracil compound as opposed to the present uracil compound is usually within a range of 1:10^15 to 10^15:1.

Examples of further preferable ratio by weight of the present uracil compound to one or more compounds selected from the group consisting of other herbicides and safeners include 1:10^15, 1:10^14, 1:10^13, 1:10^12, 1:10^11, 1:10^10, 1:10^9, 1:10^8, 1:10^7, 1:10^6, 1:10^5, 1:10000, 1:9000, 1:8000, 1:7000, 1:6000, 1:5000, 1:4000, 1:3000, 1:2000, 1:1000, 1:900, 1:800, 1:700, 1:600, 1:500, 1:400, 1:350, 1:300, 1:250, 1:200, 1:150, 1:100, 1:90, 1:80, 1:70, 1:60, 1:50, 1:40, 1:30, 1:20, 1:19, 1:18, 1:17, 1:16, 1:15, 1:14, 1:13, 1:12, 1:11, 1:10, 1:9, 1:8, 1:7, 1:6, 1:5, 2:9, 1:4, 2:7, 3:10, 1:3, 3:8, 2:5, 3:7, 4:9, 1:2, 5:9, 4:7, 3:5, 2:3, 5:7, 3:4, 7:9, 4:5, 5:6, 6:7, 7:8, 8:9, 1:1, 9:8, 8:7, 7:6, 6:5, 5:4, 9:7, 4:3, 7:5, 3:2, 5:3, 7:4, 9:5, 2:1, 9:4, 7:3, 5:2, 8:3, 3:1, 10:3, 7:2, 4:1, 9:2, 5:1, 6:1, 7:1, 8:1, 9:1, 10:1, 11:1, 12:1, 13:1, 14:1, 15:1, 16:1, 17:1, 18:1, 19:1, 20:1, 30:1, 40:1, 50:1, 60:1, 70:1, 80:1, 90:1, 100:1, 150:1, 200:1, 250:1, 300:1, 400:1, 500:1, 600:1, 700:1, 800:1, 900:1, 1000:1, 2000:1, 3000:1, 4000:1, 5000:1, 6000:1, 7000:1, 8000:1, 9000:1, 10000:1, 105:1, 106:1, 107:1, 10^8:1, 10^9:1, 10^10:1, 10^11:1, 10^12:1, 10^13:1, 10^14:1 and 10^15:1.

Examples of particularly preferable combination of the present uracil compound and one or more compounds selected from the group consisting of other herbicides and safeners include, and range of a weight ratio, but are not limited thereto, the followings.

Combination of the compound X and pyrithiobac (1:0.1 to 1:20)

Combination of the compound X and pyrithiobac-sodium (1:0.1 to 1:20)

Combination of the compound X and chlorimuron-ethyl (1:0.1 to 1:20)

Combination of the compound X and foramsulfuron (1:0.1 to 1:20)

Combination of the compound X and halosulfuron-methyl (1:0.1 to 1:20)

Combination of the compound X and nicosulfuron (1:0.1 to 1:20)

Combination of the compound X and primisulfuron-methyl (1:0.1 to 1:20)

Combination of the compound X and rimsulfuron (1:0.1 to 1:20)

Combination of the compound X and trifloxysulfuron-sodium (1:0.1 to 1:20)

Combination of the compound X and chlorsulfuron (1:0.1 to 1:20)

Combination of the compound X and iodosulfuron-methyl-sodium (1:0.1 to 1:20)

Combination of the compound X and iofensulfuron-sodium (1:0.1 to 1:20)

Combination of the compound X and mesosulfuron-methyl (1:0.1 to 1:20)

Combination of the compound X and prosulfuron (1:0.1 to 1:20)

Combination of the compound X and thifensulfuron-methyl (1:0.1 to 1:20)

Combination of the compound X and tribenuron-methyl (1:0.1 to 1:20)

Combination of the compound X and thiencarbazone-methyl (1:0.1 to 1:20)

Combination of the compound X and cloransulam-methyl (1:0.1 to 1:20)

Combination of the compound X and flumetsulam (1:0.1 to 1:20)

Combination of the compound X and imazamethabenz-methyl (1:0.1 to 1:20)

Combination of the compound X and imazamox-ammonium (1:0.1 to 1:20)

Combination of the compound X and imazapic-ammonium (1:0.1 to 1:20)

Combination of the compound X and imazapyr-isopropylammonium (1:0.1 to 1:20)

Combination of the compound X and imazaquin-ammonium (1:0.1 to 1:20)

Combination of the compound X and imazethapyr-ammonium (1:0.1 to 1:20)

Combination of the compound X and fenoxaprop-ethyl (1:0.1 to 1:20)

Combination of the compound X and fenoxaprop-P-ethyl (1:0.1 to 1:20)

Combination of the compound X and fluazifop-butyl (1:0.1 to 1:20)

Combination of the compound X and fluazifop-P-butyl (1:0.1 to 1:20)

Combination of the compound X and quizalofop-ethyl (1:0.1 to 1:20)

Combination of the compound X and quizalofop-P-ethyl (1:0.1 to 1:20)

Combination of the compound X and clethodim (1:0.1 to 1:20)

Combination of the compound X and sethoxydim (1:0.1 to 1:20)
Combination of the compound X and carfentrazone-ethyl (1:0.1 to 1:20)
Combination of the compound X and saflufenacil (1:0.1 to 1:20)
Combination of the compound X and sulfentrazone (1:0.1 to 1:30)
Combination of the compound X and pyraflufen-ethyl (1:0.1 to 1:30)
Combination of the compound X and fluthiacet-methyl (1:0.1 to 1:20)
Combination of the compound X and flufenpyr-ethyl (1:0.1 to 1:20)
Combination of the compound X and flumiclorac-pentyl (1:0.1 to 1:20)
Combination of the compound X and flumioxazin (1:0.1 to 1:20)
Combination of the compound X and oxyfluorfen (1:0.1 to 1:30)
Combination of the compound X and acifluorfen-sodium (1:0.1 to 1:30)
Combination of the compound X and fomesafen-sodium (1:0.1 to 1:30)
Combination of the compound X and lactofen (1:0.1 to 1:30)
Combination of the compound X and tiafenacil (1:0.1 to 1:20)
Combination of the compound X and trifludimoxazin (1:0.1 to 1:20)
Combination of the compound X and epyrifenacil (1:0.1 to 1:20)
Combination of the compound X and bicyclopyrone (1:0.1 to 1:20)
Combination of the compound X and mesotrione (1:0.1 to 1:20)
Combination of the compound X and tembotrione (1:0.1 to 1:20)
Combination of the compound X and isoxaflutole (1:0.1 to 1:20)
Combination of the compound X and fenquinotrione (1:0.1 to 1:20)
Combination of the compound X and topramezone (1:0.1 to 1:20)
Combination of the compound X and tolpyralate (1:0.1 to 1:20)
Combination of the compound X and lancotrione sodium (1:0.1 to 1:20)
Combination of the compound X and 2-methyl-N-(5-methyl-1,3,4-oxadiazol-2-yl)-3-(methanesulfonyl)-4-(trifluoromethyl)benzamide (CAS registry No.: 1400904-50-8) (1:0.1 to 1:20)
Combination of the compound X and 2-chloro-N-(1-methyl-1H-tetrazol-5-yl)-3-(methylthio)-4-(trifluoromethyl)benzamide (CAS registry No.: 1361139-71-0) (1:0.1 to 1:20)
Combination of the compound X and 4-(4-fluorophenyl)-6-[(2-hydroxy-6-oxo-1-cyclohexen-1-yl)carbonyl]-2-methyl-1,2,4-triazine-3,5(2H,4H)-dione (CAS registry No.: 1353870-34-4) (1:0.1 to 1:20)
Combination of the compound X and norflurazon (1:0.1 to 1:20)
Combination of the compound X and fluridone (1:0.1 to 1:20)
Combination of the compound X and bentazon (1:1 to 1:50)
Combination of the compound X and bromoxynil-octanoate (1:1 to 1:50)
Combination of the compound X and diuron (1:1 to 1:50)
Combination of the compound X and linuron (1:1 to 1:50)
Combination of the compound X and fluometuron (1:1 to 1:50)
Combination of the compound X and simazine (1:1 to 1:50)
Combination of the compound X and atrazine (1:1 to 1:50)
Combination of the compound X and ametryn (1:1 to 1:50)
Combination of the compound X and prometryn (1:1 to 1:50)
Combination of the compound X and metribuzin (1:1 to 1:50)
Combination of the compound X and alachlor (1:1 to 1:50)
Combination of the compound X and acetochlor (1:1 to 1:50)
Combination of the compound X and metolachlor (1:1 to 1:50)
Combination of the compound X and S-metolachlor (1:1 to 1:50)
Combination of the compound X and dimethenamid (1:1 to 1:50)
Combination of the compound X and dimethenamid-P (1:1 to 1:50)
Combination of the compound X and pyroxasulfone (1:0.1 to 1:20)
Combination of the compound X and flufenacet (1:0.1 to 1:20)
Combination of the compound X and trifluralin (1:1 to 1:50)
Combination of the compound X and pendimethalin (1:1 to 1:50)
Combination of the compound X and ethalfluralin (1:1 to 1:50)
Combination of the compound X and 2,4-D dimethylamine (1:1 to 1:50)
Combination of the compound X and 2,4-D choline salt (1:1 to 1:50)
Combination of the compound X and 2,4-D-2-ethylhexyl (1:1 to 1:50)
Combination of the compound X and dicamba (1:1 to 1:50)
Combination of the compound X and dicamba-biproamine (1:1 to 1:50)
Combination of the compound X and dicamba-diglycolamine (1:1 to 1:50)
Combination of the compound X and fluroxypyr (1:1 to 1:50)
Combination of the compound X and fluroxypyr-meptyl (1:1 to 1:50)
Combination of the compound X and clopyralid-olamine (1:1 to 1:50)
Combination of the compound X and clopyralid-potassium (1:1 to 1:50)
Combination of the compound X and clopyralid-triethylammonium (1:1 to 1:50)
Combination of the compound X and halauxifen (1:0.1 to 1:20)
Combination of the compound X and halauxifen-methyl (1:0.1 to 1:20)
Combination of the compound X and florpyrauxifen (1:0.1 to 1:20)

Combination of the compound X and florpyrauxifen-benzyl (1:0.1 to 1:20)

Combination of the compound X and glyphosate (1:1 to 1:50)

Combination of the compound X and glyphosate-isopropylammonium (1:1 to 1:50)

Combination of the compound X and glyphosate-ammonium (1:1 to 1:50)

Combination of the compound X and glyphosate-dimethylamine (1:1 to 1:50)

Combination of the compound X and glyphosate-monoethanolamine (1:1 to 1:50)

Combination of the compound X and glyphosate-potassium (1:1 to 1:50)

Combination of the compound X and glyphosate-guanidine (1:1 to 1:50)

Combination of the compound X and glufosinate (1:1 to 1:50)

Combination of the compound X and glufosinate-ammonium (1:1 to 1:50)

Combination of the compound X and glufosinate-P (1:1 to 1:50)

Combination of the compound X and glufosinate-P-sodium (1:1 to 1:50)

Combination of the compound X and EPIC (1:1 to 1:50)

Combination of the compound X and diflufenzopyr (1:1 to 1:50)

Combination of the compound X and diflufenzopyr-sodium (1:1 to 1:50)

Combination of the compound X and clomazone (1:1 to 1:50)

Combination of the compound X and bixlozone (1:1 to 1:50)

Combination of the compound X and tetflupyrolimet (1:1 to 1:50)

Combination of the compound X and cinmethylin (1:1 to 1:50)

Combination of the compound X and MSMA (1:1 to 1:50)

Combination of the compound X and paraquat (1:1 to 1:50)

Combination of the compound X and paraquat-dichloride (1:1 to 1:50)

Combination of the compound X and diquat (1:1 to 1:50)

Combination of the compound X and diquat-dibromide (1:1 to 1:50)

Combination of the compound X and benoxacor (1:0.1 to 1:20)

Combination of the compound X and cyprosulfamide (1:0.1 to 1:20)

Combination of the compound X and isoxadifen-ethyl (1:0.1 to 1:20)

Combination of the compound Y and pyrithiobac (1:0.1 to 1:20)

Combination of the compound Y and pyrithiobac-sodium (1:0.1 to 1:20)

Combination of the compound Y and chlorimuron-ethyl (1:0.1 to 1:20)

Combination of the compound Y and foramsulfuron (1:0.1 to 1:20)

Combination of the compound Y and halosulfuron-methyl (1:0.1 to 1:20)

Combination of the compound Y and nicosulfuron (1:0.1 to 1:20)

Combination of the compound Y and primisulfuron-methyl (1:0.1 to 1:20)

Combination of the compound Y and rimsulfuron (1:0.1 to 1:20)

Combination of the compound Y and trifloxysulfuron-sodium (1:0.1 to 1:20)

Combination of the compound Y and chlorsulfuron (1:0.1 to 1:20)

Combination of the compound Y and iodosulfuron-methyl-sodium (1:0.1 to 1:20)

Combination of the compound Y and iofensulfuron-sodium (1:0.1 to 1:20)

Combination of the compound Y and metsulfuron-methyl (1:0.1 to 1:20)

Combination of the compound Y and prosulfuron (1:0.1 to 1:20)

Combination of the compound Y and thifensulfuron-methyl (1:0.1 to 1:20)

Combination of the compound Y and tribenuron-methyl (1:0.1 to 1:20)

Combination of the compound Y and thiencarbazone-methyl (1:0.1 to 1:20)

Combination of the compound Y and cloransulam-methyl (1:0.1 to 1:20)

Combination of the compound Y and flumetsulam (1:0.1 to 1:20)

Combination of the compound Y and imazamethabenz-methyl (1:0.1 to 1:20)

Combination of the compound Y and imazamox-ammonium (1:0.1 to 1:20)

Combination of the compound Y and imazapic-ammonium (1:0.1 to 1:20)

Combination of the compound Y and imazapyr-isopropylammonium (1:0.1 to 1:20)

Combination of the compound Y and imazaquin-ammonium (1:0.1 to 1:20)

Combination of the compound Y and imazethapyr-ammonium (1:0.1 to 1:20)

Combination of the compound Y and fenoxaprop-ethyl (1:0.1 to 1:20)

Combination of the compound Y and fenoxaprop-P-ethyl (1:0.1 to 1:20)

Combination of the compound Y and fluazifop-butyl (1:0.1 to 1:20)

Combination of the compound Y and fluazifop-P-butyl (1:0.1 to 1:20)

Combination of the compound Y and quizalofop-ethyl (1:0.1 to 1:20)

Combination of the compound Y and quizalofop-P-ethyl (1:0.1 to 1:20)

Combination of the compound Y and clethodim (1:0.1 to 1:20)

Combination of the compound Y and sethoxydim (1:0.1 to 1:20)

Combination of the compound Y and carfentrazone-ethyl (1:0.1 to 1:20)

Combination of the compound Y and saflufenacil (1:0.1 to 1:20)

Combination of the compound Y and sulfentrazone (1:0.1 to 1:30)

Combination of the compound Y and pyraflufen-ethyl (1:0.1 to 1:30)

Combination of the compound Y and fluthiacet-methyl (1:0.1 to 1:20)

Combination of the compound Y and flufenpyr-ethyl (1:0.1 to 1:20)

Combination of the compound Y and flumiclorac-pentyl (1:0.1 to 1:20)

Combination of the compound Y and flumioxazin (1:0.1 to 1:20)

Combination of the compound Y and oxyfluorfen (1:0.1 to 1:30)

Combination of the compound Y and acifluorfen-sodium (1:0.1 to 1:30)

Combination of the compound Y and fomesafen-sodium (1:0.1 to 1:30)

Combination of the compound Y and lactofen (1:0.1 to 1:30)

Combination of the compound Y and tiafenacil (1:0.1 to 1:20)

Combination of the compound Y and trifludimoxazin (1:0.1 to 1:20)

Combination of the compound Y and epyrifenacil (1:0.1 to 1:20)

Combination of the compound Y and bicyclopyrone (1:0.1 to 1:20)

Combination of the compound Y and mesotrione (1:0.1 to 1:20)

Combination of the compound Y and tembotrione (1:0.1 to 1:20)

Combination of the compound Y and isoxaflutole (1:0.1 to 1:20)

Combination of the compound Y and fenquinotrione (1:0.1 to 1:20)

Combination of the compound Y and topramezone (1:0.1 to 1:20)

Combination of the compound Y and tolpyralate (1:0.1 to 1:20)

Combination of the compound Y and lancotrione sodium (1:0.1 to 1:20)

Combination of the compound Y and 2-methyl-N-(5-methyl-1,3,4-oxadiazol-2-yl)-3-(methylsulfonyl)-4-(trifluoromethyl)benzamide (CAS registry No.: 1400904-50-8) (1:0.1 to 1:20)

Combination of the compound Y and 2-chloro-N-(1-methyl-1H-tetrazol-5-yl)-3-(methylthio)-4-(trifluoromethyl)benzamide (CAS registry No.: 1361139-71-0) (1:0.1 to 1:20)

Combination of the compound Y and 4-(4-fluorophenyl)-6-[(2-hydroxy-6-oxo-1-cyclohexen-1-yl)carbonyl]-2-methyl-1,2,4-triazine-3,5(2H,4H)-dione (CAS registry No.: 1353870-34-4) (1:0.1 to 1:20)

Combination of the compound Y and norflurazon (1:0.1 to 1:20)

Combination of the compound Y and fluridone (1:0.1 to 1:20)

Combination of the compound Y and bentazon (1:1 to 1:50)

Combination of the compound Y and bromoxynil-octanoate (1:1 to 1:50)

Combination of the compound Y and diuron (1:1 to 1:50)

Combination of the compound Y and linuron (1:1 to 1:50)

Combination of the compound Y and fluometuron (1:1 to 1:50)

Combination of the compound Y and simazine (1:1 to 1:50)

Combination of the compound Y and atrazine (1:1 to 1:50)

Combination of the compound Y and ametryn (1:1 to 1:50)

Combination of the compound Y and prometryn (1:1 to 1:50)

Combination of the compound Y and metribuzin (1:1 to 1:50)

Combination of the compound Y and alachlor (1:1 to 1:50)

Combination of the compound Y and acetochlor (1:1 to 1:50)

Combination of the compound Y and metolachlor (1:1 to 1:50)

Combination of the compound Y and S-metolachlor (1:1 to 1:50)

Combination of the compound Y and dimethenamid (1:1 to 1:50)

Combination of the compound Y and dimethenamid-P (1:1 to 1:50)

Combination of the compound Y and pyroxasulfone (1:0.1 to 1:20)

Combination of the compound Y and flufenacet (1:0.1 to 1:20)

Combination of the compound Y and trifluralin (1:1 to 1:50)

Combination of the compound Y and pendimethalin (1:1 to 1:50)

Combination of the compound Y and ethalfluralin (1:1 to 1:50)

Combination of the compound Y and 2,4-D dimethylamine (1:1 to 1:50)

Combination of the compound Y and 2,4-D choline salt (1:1 to 1:50)

Combination of the compound Y and 2,4-D-2-ethylhexyl (1:1 to 1:50)

Combination of the compound Y and dicamba (1:1 to 1:50)

Combination of the compound Y and dicamba-biproamine (1:1 to 1:50)

Combination of the compound Y and diglycolamine salt (1:1 to 1:50)

Combination of the compound Y and fluroxypyr (1:1 to 1:50)

Combination of the compound Y and fluroxypyr-meptyl (1:1 to 1:50)

Combination of the compound Y and clopyralid-olamine (1:1 to 1:50)

Combination of the compound Y and clopyralid-potassium (1:1 to 1:50)

Combination of the compound Y and clopyralid-triethylammonium (1:1 to 1:50)Combination of the compound Y and halauxifen (1:0.1 to 1:20)

Combination of the compound Y and halauxifen-methyl (1:0.1 to 1:20)

Combination of the compound Y and florpyrauxifen (1:0.1 to 1:20)

Combination of the compound Y and florpyrauxifen-benzyl (1:0.1 to 1:20)

Combination of the compound Y and glyphosate (1:1 to 1:50)

Combination of the compound Y and glyphosate-isopropylammonium (1:1 to 1:50)

Combination of the compound Y and glyphosate-ammonium (1:1 to 1:50)

Combination of the compound Y and glyphosate-dimethylamine (1:1 to 1:50)

Combination of the compound Y and glyphosate-monoethanolamine (1:1 to 1:50)

Combination of the compound Y and glyphosate-potassium (1:1 to 1:50)

Combination of the compound Y and glyphosate-guanidine (1:1 to 1:50)

Combination of the compound Y and glufosinate (1:1 to 1:50)

Combination of the compound Y and glufosinate-ammonium (1:1 to 1:50)

Combination of the compound Y and glufosinate-P (1:1 to 1:50)
Combination of the compound Y and glufosinate-P-sodium (1:1 to 1:50)
Combination of the compound Y and EPIC (1:1 to 1:50)
Combination of the compound Y and diflufenzopyr (1:1 to 1:50)
Combination of the compound Y and diflufenzopyr-sodium (1:1 to 1:50)
Combination of the compound Y and clomazone (1:1 to 1:50)
Combination of the compound Y and bixlozone (1:1 to 1:50)
Combination of the compound Y and tetflupyrolimet (1:1 to 1:50)
Combination of the compound Y and cinmethylin (1:1 to 1:50)
Combination of the compound Y and MSMA (1:1 to 1:50)
Combination of the compound Y and paraquat (1:1 to 1:50)
Combination of the compound Y and paraquat-dichloride (1:1 to 1:50)
Combination of the compound Y and diquat (1:1 to 1:50)
Combination of the compound Y and diquat-dibromide (1:1 to 1:50)
Combination of the compound Y and benoxacor (1:0.1 to 1:20)
Combination of the compound Y and cyprosulfamide (1:0.1 to 1:20)
Combination of the compound Y and isoxadifen-ethyl (1:0.1 to 1:20)
compound Z and pyrithiobac (1:0.1 to 1:20)
compound Z and pyrithiobac-sodium (1:0.1 to 1:20)
compound Z and chlorimuron-ethyl (1:0.1 to 1:20)
compound Z and foramsulfuron (1:0.1 to 1:20)
compound Z and halosulfuron-methyl (1:0.1 to 1:20)
compound Z and nicosulfuron (1:0.1 to 1:20)
compound Z and primisulfuron-methyl (1:0.1 to 1:20)
compound Z and rimsulfuron (1:0.1 to 1:20)
compound Z and trifloxysulfuron-sodium (1:0.1 to 1:20)
compound Z and chlorsulfuron (1:0.1 to 1:20)
compound Z and iodosulfuron-methyl-sodium (1:0.1 to 1:20)
compound Z and iofensulfuron-sodium (1:0.1 to 1:20)
compound Z and metsulfuron-methyl (1:0.1 to 1:20)
compound Z and prosulfuron (1:0.1 to 1:20)
compound Z and thifensulfuron-methyl (1:0.1 to 1:20)
compound Z and tribenuron-methyl (1:0.1 to 1:20)
compound Z and thiencarbazone-methyl (1:0.1 to 1:20)
compound Z and cloransulam-methyl (1:0.1 to 1:20)
compound Z and flumetsulam (1:0.1 to 1:20)
compound Z and imazamethabenz-methyl (1:0.1 to 1:20)
compound Z and imazamox-ammonium (1:0.1 to 1:20)
compound Z and imazapic-ammonium (1:0.1 to 1:20)
compound Z and imazapyr-isopropylammonium (1:0.1 to 1:20)
compound Z and imazaquin-ammonium (1:0.1 to 1:20)
compound Z and imazethapyr-ammonium (1:0.1 to 1:20)
compound Z and fenoxaprop-ethyl (1:0.1 to 1:20)
compound Z and fenoxaprop-P-ethyl (1:0.1 to 1:20)
compound Z and fluazifop-butyl (1:0.1 to 1:20)
compound Z and fluazifop-P-butyl (1:0.1 to 1:20)
compound Z and quizalofop-ethyl (1:0.1 to 1:20)
compound Z and quizalofop-P-ethyl (1:0.1 to 1:20)
compound Z and clethodim (1:0.1 to 1:20)
compound Z and sethoxydim (1:0.1 to 1:20)
compound Z and carfentrazone-ethyl (1:0.1 to 1:20)
compound Z and saflufenacil (1:0.1 to 1:20)
compound Z and sulfentrazone (1:0.1 to 1:30)
compound Z and pyraflufen-ethyl (1:0.1 to 1:30)
compound Z and fluthiacet-methyl (1:0.1 to 1:20)
compound Z and flufenpyr-ethyl (1:0.1 to 1:20)
compound Z and flumiclorac-pentyl (1:0.1 to 1:20)
compound Z and flumioxazin (1:0.1 to 1:20)
compound Z and oxyfluorfen (1:0.1 to 1:30)
compound Z and acifluorfen-sodium (1:0.1 to 1:30)
compound Z and fomesafen-sodium (1:0.1 to 1:30)
compound Z and lactofen (1:0.1 to 1:30)
compound Z and tiafenacil (1:0.1 to 1:20)
compound Z and trifludimoxazin (1:0.1 to 1:20)
compound Z and epyrifenacil (1:0.1 to 1:20)
compound Z and bicyclopyrone (1:0.1 to 1:20)
compound Z and mesotrione (1:0.1 to 1:20)
compound Z and tembotrione (1:0.1 to 1:20)
compound Z and isoxaflutole (1:0.1 to 1:20)
compound Z and fenquinotrione (1:0.1 to 1:20)
compound Z and topramezone (1:0.1 to 1:20)
compound Z and tolpyralate (1:0.1 to 1:20)
compound Z and lancotrione sodium (1:0.1 to 1:20)
compound Z and 2-methyl-N-(5-methyl-1,3,4-oxadiazol-2-yl)-3-(methylsulfonyl)-4-(trifluoromethyl)benzamide (CAS registry No.: 1400904-50-8) (1:0.1 to 1:20)
compound Z and 2-chloro-N-(1-methyl-1H-tetrazol-5-yl)-3-(methylthio)-4-(trifluoromethyl)benzamide (CAS registry No.: 1361139-71-0) (1:0.1 to 1:20)
compound Z and 4-(4-fluorophenyl)-6-[(2-hydroxy-6-oxo-1-cyclohexen-1-yl)carbonyl]-2-methyl-1,2,4-triazine-3,5(2H,4H)-dione (CAS registry No.: 1353870-34-4) (1:0.1 to 1:20)
compound Z and norflurazon (1:0.1 to 1:20)
compound Z and fluridone (1:0.1 to 1:20)
compound Z and bentazon (1:1 to 1:50)
compound Z and bromoxynil-octanoate (1:1 to 1:50)
compound Z and diuron (1:1 to 1:50)
compound Z and linuron (1:1 to 1:50)
compound Z and fluometuron (1:1 to 1:50)
compound Z and simazine (1:1 to 1:50)
compound Z and atrazine (1:1 to 1:50)
compound Z and ametryn (1:1 to 1:50)
compound Z and prometryn (1:1 to 1:50)
compound Z and metribuzin (1:1 to 1:50)
compound Z and alachlor (1:1 to 1:50)
compound Z and acetochlor (1:1 to 1:50)
compound Z and metolachlor (1:1 to 1:50)
compound Z and S-metolachlor (1:1 to 1:50)
compound Z and dimethenamid (1:1 to 1:50)
compound Z and dimethenamid-P (1:1 to 1:50)
compound Z and pyroxasulfone (1:0.1 to 1:20)
compound Z and flufenacet (1:0.1 to 1:20)
compound Z and trifluralin (1:1 to 1:50)
compound Z and pendimethalin (1:1 to 1:50)
compound Z and ethalfluralin (1:1 to 1:50)
compound Z and 2,4-D dimethylamine (1:1 to 1:50)
compound Z and 2,4-D choline salt (1:1 to 1:50)
compound Z and 2,4-D-2-ethylhexyl (1:1 to 1:50)
compound Z and dicamba (1:1 to 1:50)
compound Z and dicamba-biproamine (1:1 to 1:50)
compound Z and diglycolamine salt (1:1 to 1:50)
compound Z and fluroxypyr (1:1 to 1:50)
compound Z and fluroxypyr-meptyl (1:1 to 1:50)
compound Z and clopyralid-olamine (1:1 to 1:50)
compound Z and clopyralid-potassium (1:1 to 1:50)

compound Z and clopyralid-triethylammonium (1:1 to 1:50)
compound Z and halauxifen (1:0.1 to 1:20)
compound Z and halauxifen-methyl (1:0.1 to 1:20)
compound Z and florpyrauxifen (1:0.1 to 1:20)
compound Z and florpyrauxifen-benzyl (1:0.1 to 1:20)
compound Z and glyphosate (1:1 to 1:50)
compound Z and glyphosate-isopropylammonium (1:1 to 1:50)
compound Z and glyphosate-ammonium (1:1 to 1:50)
compound Z and glyphosate-dimethylamine (1:1 to 1:50)
compound Z and glyphosate-monoethanolamine (1:1 to 1:50)
compound Z and glyphosate-potassium (1:1 to 1:50)
compound Z and glyphosate-guanidine (1:1 to 1:50)
compound Z and glufosinate (1:1 to 1:50)
compound Z and glufosinate-ammonium (1:1 to 1:50)
compound Z and glufosinate-P (1:1 to 1:50)
compound Z and glufosinate-P-sodium (1:1 to 1:50)
compound Z and EPIC (1:1 to 1:50)
compound Z and diflufenzopyr (1:1 to 1:50)
compound Z and diflufenzopyr-sodium (1:1 to 1:50)
compound Z and clomazone (1:1 to 1:50)
compound Z and bixlozone (1:1 to 1:50)
compound Z and tetflupyrolimet (1:1 to 1:50)
compound Z and cinmethylin (1:1 to 1:50)
compound Z and MSMA (1:1 to 1:50)
compound Z and paraquat (1:1 to 1:50)
compound Z and paraquat-dichloride (1:1 to 1:50)
compound Z and diquat (1:1 to 1:50)
compound Z and diquat-dibromide (1:1 to 1:50)
compound Z and benoxacor (1:0.1 to 1:20)
compound Z and cyprosulfamide (1:0.1 to 1:20)
compound Z and isoxadifen-ethyl (1:0.1 to 1:20)

In the crop cultivation of the present invention, a plant-nutritional management in common crop cultivation can be made. A fertilization system may be one based on Precision Agriculture, or may be a conventional homogeneous one. Alternatively, a nitrogen-fixing bacterium or a mycorrhizal fungus may be inoculated together with one or more agricultural active ingredients selected from the compound group A.

EXAMPLES

Hereinbelow, the present invention will be described in more detail by way of Examples. However, the present invention is not limited by these Examples.

Reference Production Example 1

A mixture of 180 mg of 1-{2-chloro-4-fluoro-5-[3-methyl-2,6-dioxo-4-(trifluoromethyl)-1,2,3,6-tetrahydropyrimidin-1-yl]phenoxy}cyclopropane carboxylic acid, 61 μL of ethyl bromoacetate, 46 mg of sodium hydrogen carbonate and 2 mL of DMF was stirred at 50° C. for 3 hours. Water and saturated aqueous sodium hydrogen carbonate were added to the resulting mixture and the mixture was extracted with MTBE. The resulting organic layer was sequentially washed with water and saturated saline, dried over anhydrous magnesium sulfate and then concentrated under reduced pressure. The resulting residue was purified by silica gel column chromatography (hexane:ethyl acetate=20:1 to 3:7) to obtain 188 mg of a viscous oily compound X.

Compound X: $^{1}$H-NMR ($CDCl_3$) δ: 7.28 (1H, d), 7.18 (1H, d), 6.33 (1H, s), 4.68 (1H, d), 4.62 (1H, d), 4.18-4.11 (2H, m), 3.56-3.53 (3H, m), 1.74-1.67 (2H, m), 1.51-1.43 (2H, m), 1.25 (3H, t).

Reference Production Example 2

A mixture of 100 mg of 1-{2-chloro-4-fluoro-5-[3-methyl-2,6-dioxo-4-(trifluoromethyl)-1,2,3,6-tetrahydropyrimidin-1-yl]phenoxy}cyclopropane carboxylic acid, 26 μL of ethyl bromoacetate, 24 mg of sodium hydrogen carbonate and 1 mL of DMF was stirred at 50° C. for 3 hours. Water and saturated aqueous sodium hydrogen carbonate were added to the resulting mixture and the mixture was extracted with MTBE. The resulting organic layer was sequentially washed with water and saturated saline, dried over anhydrous magnesium sulfate and then concentrated under reduced pressure. The resulting residue was purified by silica gel column chromatography (hexane:ethyl acetate=20:1 to 3:7) to obtain 107 mg of a viscous oily compound Y.

Compound Y: $^{1}$H-NMR ($CDCl_3$) δ: 7.28 (1H, d), 7.16 (1H, d), 6.33 (1H, s), 4.70 (1H, d), 4.64 (1H, d), 3.70 (3H, s), 3.56-3.54 (3H, m), 1.73-1.69 (2H, m), 1.50-1.44 (2H, m).

Formulation Example 1

35 Parts of a mixture (weight ratio of 1:1) of polyoxyethylene alkyl ether sulfate ammonium salt and silica, 10 parts of the compound X, the compound Y or the compound Z, and 55 parts of water are mixed, followed by finely grinding by a wet grinding method to obtain a formulation.

Formulation Example 2

50 Parts of the compound X, the compound Y or the compound Z, 3 parts of calcium lignin sulfonate, 2 parts of sodium lauryl sulfate and 45 parts of silica are ground and mixed to obtain a formulation.

Formulation Example 3

5 Parts of the compound X, the compound Y or the compound Z, 9 parts of polyoxyethylene styryl phenyl ether, 5 parts of polyoxyethylene decyl ether (number of ethylene oxide added: 5), 6 parts of calcium dodecylbenzene sulfonate and 75 parts of xylene are mixed to obtain a formulation.

Formulation Example 4

2 Parts of the compound X, the compound Y or the compound Z, 1 part of silica, 2 parts of calcium lignin sulfonate, 30 parts of bentonite and 65 parts of kaolin clay are ground and mixed, and then an adequate amount of water is added, and after kneading the mixture, the kneaded mixture is granulated by a granulator and then dried to obtain a formulation.

Formulation Example 5

10 Parts of the compound X, the compound Y or the compound Z is mixed with a mixture of 18 parts of benzyl alcohol and 9 parts of DMSO, and then 6.3 parts of GERONOL (registered trademark) TE250, 2.7 parts of Ethylan NS-500LQ (registered trademark) and 54 parts of solvent naphtha are added, followed by mixing to obtain a formulation.

Criteria for the evaluation of the herbicidal effect and the crop injury shown in the below-mentioned examples will be shown.

[Herbicidal Effect and Crop Injury]

The herbicidal effect was rated within a range of 0 to 100, wherein "0" was a rating where the state of emergence or growth of a sample weed during a test had no difference or little difference compared with the state of the test weed that did not subjected to the treatment, and "100" was a rating where the test plant was completely killed or the emergence or growth of the test weed was completely suppressed.

The crop injury was rated as "harmless" when little injury was observed, "low" when a moderate level of injury was observed, "medium" when a medium level of injury was observed, and "high" when a high level of injury was observed.

Example 1

In a plastic pot, palmer amaranth (*Amaranthus palmeri*) having an Arg128Met mutation in PPO2 is seeded. On the same day, compound X is applied to the surface of soil so that the application rate of the compound X is 10, 20, 40 or 80 g/ha and the spray volume is 200 L/ha. The plastic pot is then placed in a greenhouse, and at 7 days after the application, soybeans are seeded, and further at 14 days after seeding the soybeans, the effect on the weeds and crop injuries on the soybeans are investigated. An effective control effect on the palmer amaranth is confirmed.

Example 2

In a plastic pot, palmer amaranth (*Amaranthus palmeri*) having an Arg128Met mutation in PPO2 and soybeans are seeded. On the same day, compound X is applied to the surface of soil so that the application rate of the compound X is 10, 20, 40 or 80 g/ha and the spray volume is 200 L/ha. The soybeans are then cultivated in a greenhouse, and at 21 days after seeding, the effect on the weeds and crop injuries on the soybeans are investigated. An effective control effect on the palmer amaranth is confirmed.

Example 3

In a plastic pot, palmer amaranth (*Amaranthus palmeri*) having an Arg128Met mutation in PPO2 and soybeans are seeded. The soybeans are then cultivated in a greenhouse, and at 21 days after seeding, compound X is foliar-treated so that the application rate of the compound X is 10, 20, 40 or 80 g/ha and the spray liquid amount is 200 L/ha. Further, the soybeans are cultivated in the greenhouse, and at 14 days after the application of compound X, the effect on the weeds and crop injuries on the soybeans are investigated. An effective control effect on the palmer amaranth is confirmed.

Examples 4 to 6

The application is performed in the same manner, except that the palmer amaranth (*Amaranthus palmeri*) of Examples 1 to 3 is replaced by palmer amaranth (*Amaranthus palmeri*) having an Arg128Gly mutation in PPO2. An effective control effect on the palmer amaranth is confirmed.

Examples 7 to 9

The application is performed in the same manner, except that the palmer amaranth (*Amaranthus palmeri*) of Examples 1 to 3 is replaced by palmer amaranth (*Amaranthus palmeri*) having an Arg128His mutation in PPO2. An effective control effect on the palmer amaranth is confirmed.

Examples 10 to 12

The application is performed in the same manner, except that the palmer amaranth (*Amaranthus palmeri*) of Examples 1 to 3 is replaced by palmer amaranth (*Amaranthus palmeri*) having an Arg128Ile mutation in PPO2. An effective control effect on the palmer amaranth is confirmed.

Examples 13 to 15

The application is performed in the same manner, except that the palmer amaranth (*Amaranthus palmeri*) of Examples 1 to 3 is replaced by palmer amaranth (*Amaranthus palmeri*) having an Gly210 deficient mutation in PPO2. An effective control effect on the palmer amaranth is confirmed.

Examples 16 to 18

The application is performed in the same manner, except that the palmer amaranth (*Amaranthus palmeri*) of Examples 1 to 3 is replaced by palmer amaranth (*Amaranthus palmeri*) having a Gly399Ala mutation in PPO2. An effective control effect on the palmer amaranth is confirmed.

Examples 19 to 36

The application is performed in the same manner, except that the palmer amaranth (*Amaranthus palmeri*) of Examples 1 to 18 is replaced by waterhemp (*Amaranthus tuberculatus=Amaranthus rudis=Amaranthus tamariscinus*). An effective control effect on the waterhemp is confirmed.

Examples 37 to 54

The application is performed in the same manner, except that the palmer amaranth (*Amaranthus palmeri*) of Examples 1 to 18 is replaced by common ragweed (*Ambrosia artemisiifolia*). An effective control effect on the common ragweed is confirmed.

Examples 55 to 72

The application is performed in the same manner, except that the palmer amaranth (*Amaranthus palmeri*) of Examples 1 to 18 is replaced by rigid ryegrass (*Lolium rigidum*) or Italian ryegrass (*Lolium multiflorum*). An effective control effect on the rigid ryegrass or Italian ryegrass is confirmed.

Examples 73 to 144

The application is performed in the same manner, except that the compound X of Examples 1 to 72 is replaced by the compound Y. An effective control effect on the PPO inhibitor-resistant weeds is confirmed.

Examples 145 to 216

The application is performed in the same manner, except that the compound X of Examples 1 to 72 is replaced by the compound Z. An effective control effect on the PPO inhibitor-resistant weeds is confirmed.

Examples 217 to 432

In each application of Examples 1 to 216, in addition to the compound X, the compound Y or the compound Z, RoundupPowerMax (glyphosate-potassium salt 660 g/L) is further added so that the application rate is 32 fluid ounce/acre (1,543 g/ha as glyphosate-potassium salt). Then the application procedure is performed in the same manner. An effective control effect on the PPO inhibitor-resistant weeds is confirmed.

Examples 433 to 648

In each application of Examples 1 to 216, in addition to the compound X, the compound Y or the compound Z, XtendiMax (dicamba-diglycolamine salt 480 g/L) is further added so that the application rate is 1 pint/acre (560 g/ha as dicamba). Then the application procedure is performed in the same manner. An effective control effect on the PPO inhibitor-resistant weeds is confirmed.

Examples 649 to 864

In each application of Examples 1 to 216, in addition to the compound X, the compound Y or the compound Z, RoundupPowerMax and XtendiMax are further added so that the application rate of RoundupPowerMax is 32 fluid ounce/acre and the application rate of XtendiMax is 1 pint/acre, respectively. Then the application procedure is performed in the same manner. An effective control effect on the PPO inhibitor-resistant weeds is confirmed.

Examples 865 to 1728

The application is performed in the same manner, except that soybean of Examples 1 to 864 is replaced by corn or cotton. An effective control effect on the PPO inhibitor-resistant weeds is confirmed.

Examples 1729 to 3456

The crops in Examples 1 to 1728 are replaced by crops produced by a transgenic technique, having both a Roundup Ready 2 Xtend trait and a trait having tolerance to PPO inhibitors due to having exogenous PPO in which the affinity to PPO inhibitors to be applied is lower than that to endogenous PPO in crops. Then the application procedure is performed in the same manner. An effective control effect on the PPO inhibitor-resistant weeds is confirmed.

Example 3457

The compound X (55 mg) produced in Reference Production Example 1, Emulsogen TS290 (polyoxyethylene tristyrylphenyl ether, manufactured by Clariant) (76.5 mg), and Phenylsulfonat CAL (mixture of 70% calcium dodecylbenzene sulfonate and 30% isobutanol, manufactured by Clariant) (76.5 mg) were dissolved in Solvesso 200ND (aromatic hydrocarbon, manufactured by Exxon Mobile) to make a total volume of 1 ml, thus preparing a emulsifiable concentrate (hereinafter referred to as Formulation X).

Soil was filled in a plastic pot, and palmer amaranth (*Amaranthus palmeri*) having a Gly210 deficiency in PPO2, palmer amaranth (*Amaranthus palmeri*) containing an Arg128gly mutation in PPO2, and palmer amaranth (*Amaranthus palmeri*) having a Gly399Ala mutation in PPO2 were seeded, and then grown in a greenhouse. When the plant height reached 20 cm, spray liquid obtained by diluting a predetermined amount of the formulation X with water containing a 1% (w/v) spreader (Agri-Dex) was evenly sprayed from above the pot using a sprayer such that the spray volume was 200 L/ha and the application rate of the compound X was 20 or 40 g/ha. The plants were then grown for 14 days in the greenhouse, and the herbicidal effect was evaluated. As a control, the formulation X was replaced by a tiafenacil microemulsion Terrador (manufactured by Dongbu Farm Hannong Co., Ltd.), and the application procedure was carried out in the same manner. The results are shown in Table 1.

TABLE 1

| | Compound X (g/ha) | | Tiafenacil (g/ha) | |
|---|---|---|---|---|
| Weed species | 40 | 20 | 40 | 20 |
| Palmer amaranth (Amaranthus palmeri) having Gly210 deficiency in PPO2 | 98 | 95 | 30 | 20 |
| Palmer amaranth (Amaranthus palmeri) having Arg128Gly mutation in PPO2 | 95 | — | 40 | 30 |
| Palmer amaranth (Amaranthus palmeri) having Gly399Ala mutation in PPO2 | 98 | 99 | 40 | 40 |

Example 3458

The application procedure was performed in the same manner, except that PPO inhibitor-resistant weeds of Example 3457 were replaced by waterhemp (*Amaranthus tuberculatus=Amaranthus rudis=Amaranthus tamariscinus*) having Gly210 deficiency in PPO2. The results are shown in Table 2.

TABLE 2

| | Compound X (g/ha) | | Tiafenacil (g/ha) | |
|---|---|---|---|---|
| Weed species | 40 | 20 | 40 | 20 |
| Waterhemp (Amaranthus tuberculatus = Amaranthus rudis = Amaranthus tamariscinus) having Gly210 deficiency in PPO2 (weeds mentioned in Examples of Patent Literature 2) | 99 | 99 | 70 | 50 |

INDUSTRIAL APPLICABILITY

The method for controlling herbicide-resistant weeds of the present invention can be used to control specific weeds having resistance to herbicides.

The invention claimed is:

1. A method for controlling PPO inhibitor-resistant weeds, the method comprising:

applying, to PPO inhibitor-resistant weeds, a compound represented by formula (I):

(I)

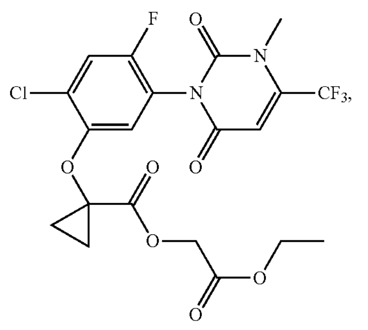

wherein the PPO inhibitor-resistant weeds are PPO inhibitor-resistant palmer amaranth or PPO inhibitor-resistant waterhemp.

2. The method according to claim 1, wherein the resistance of the PPO inhibitor-resistant weeds are target-site resistance.

3. The method according to claim 1, wherein the resistance of the PPO inhibitor-resistant weeds are non-target-site resistance.

4. The method according to claim 1, which is carried out in crop cultivation.

5. The method according to claim 4, wherein the crop is one crop selected from the group consisting of soybean, corn, cotton, rapeseed, rice, wheat, barley, sugar cane, sugar beet, sorghum and sunflower.

6. The method according to claim 4, wherein the crop is a crop which is imparted with tolerance to the compound represented by formula (I).

7. The method according to claim 1, wherein the PPO inhibitor-resistant weeds have acquired resistance to other herbicides.

8. The method according to claim 1, wherein an application rate of the compound represented by formula (I) is 10 to 80 g/ha.

9. The method according to claim 1, wherein the PPO inhibitor-resistant weeds are PPO inhibitor-resistant palmer amaranth, and wherein the PPO inhibitor-resistant palmer amaranth has at least one mutation in its PPO2 selected from the group consisting of a Gly210 deletion, a Arg128Gly mutation, and a Gly399Ala mutation.

* * * * *